(12) United States Patent
Suppa et al.

(10) Patent No.: US 12,263,919 B2
(45) Date of Patent: Apr. 1, 2025

(54) UNDERWATER DEVICE AND UNDERWATER SYSTEM

(71) Applicant: THALES, Courbevoie (FR)

(72) Inventors: Vito Suppa, Sophia Antipolis (FR); Michel Ricard, Sophia Antipolis (FR)

(73) Assignee: THALES, Courbevoie (FR)

( * ) Notice: Subject to any disclaimer, the term of this patent is extended or adjusted under 35 U.S.C. 154(b) by 687 days.

(21) Appl. No.: 17/615,022

(22) PCT Filed: Apr. 29, 2020

(86) PCT No.: PCT/EP2020/061831
§ 371 (c)(1),
(2) Date: Nov. 29, 2021

(87) PCT Pub. No.: WO2020/239346
PCT Pub. Date: Dec. 3, 2020

(65) Prior Publication Data
US 2022/0234693 A1    Jul. 28, 2022

(30) Foreign Application Priority Data
May 29, 2019   (FR) ...................................... 1905720

(51) Int. Cl.
*B63B 21/66* (2006.01)
*B63B 21/16* (2006.01)
(Continued)

(52) U.S. Cl.
CPC .............. *B63B 21/66* (2013.01); *B63B 21/16* (2013.01); *B63B 27/08* (2013.01); *B63B 27/36* (2013.01);
(Continued)

(58) Field of Classification Search
CPC ......... B63B 21/16; B63B 21/66; B63B 27/08; B63B 27/36; B63B 79/10; B63G 8/42;
(Continued)

(56) References Cited

U.S. PATENT DOCUMENTS

| | | | | |
|---|---|---|---|---|
| 1,527,478 A | * | 2/1925 | Harper ..................... | B66D 1/30 242/603 |
| 2,802,638 A | * | 8/1957 | Ireland ..................... | B64F 1/08 242/397.3 |

(Continued)

FOREIGN PATENT DOCUMENTS

| | | | |
|---|---|---|---|
| CA | 2 997 197 A1 | 4/2017 | |
| FR | 2 925 231 A1 | 6/2009 | |

(Continued)

*Primary Examiner* — Ajay Vasudeva
(74) *Attorney, Agent, or Firm* — BakerHostetler

(57) ABSTRACT

A handling device includes a winch comprising a frame, intended to be attached to a structure of the surface vessel and a first drum capable of turning relative to the frame about a first rotation axis and an assembly comprising at least one second drum which surrounds the first drum and is capable of turning relative to the frame about a second rotation axis substantially parallel to the first rotation axis, the winch being capable of being in a decoupled state wherein the first drum and the second drum are rotationally decoupled about the first rotation axis and the second rotation axis so as to allow a traction cable to be wound around the first drum during a first winding step wherein the first drum is rotated about the first axis, the second drum being capable of being in an open state wherein the second drum has a receiving opening that a towed body is capable of passing through in order to enter the interior of the space that surrounds the first drum and that is surrounded by the second drum, the winch being capable of being in a coupled state wherein the first drum and the second drum are rotationally coupled about the second rotation axis so as to (Continued)

allow a flexible elongate body to be wound around the second rotation axis during a second winding step wherein the second drum is rotated about the second axis.

15 Claims, 11 Drawing Sheets

(51) Int. Cl.
    *B63B 27/08*      (2006.01)
    *B63B 27/36*      (2006.01)
    *B63B 79/10*      (2020.01)
    *B65H 75/42*      (2006.01)
    *B65H 75/44*      (2006.01)
    *B66D 1/26*      (2006.01)
    *B66D 1/30*      (2006.01)
    *B66D 1/38*      (2006.01)
    *G01V 1/38*      (2006.01)

(52) U.S. Cl.
CPC ............ *B63B 79/10* (2020.01); *B65H 75/425* (2013.01); *B65H 75/4465* (2013.01); *B66D 1/26* (2013.01); *B66D 1/30* (2013.01); *B66D 1/38* (2013.01); *G01V 1/3843* (2013.01); *B65H 75/4407* (2013.01); *B65H 2701/534* (2013.01)

(58) Field of Classification Search
CPC ............ B65H 2701/534; B65H 75/425; B65H 75/4407; B65H 75/4465; G01V 1/38; G01V 1/3817; G01V 1/3843; B66D 1/26; B66D 1/30; B66D 1/38

See application file for complete search history.

(56) References Cited

U.S. PATENT DOCUMENTS

| | | | | |
|---|---|---|---|---|
| 3,576,295 | A * | 4/1971 | Hale | B65H 75/04 254/374 |
| 3,782,319 | A * | 1/1974 | Hale | B66C 13/02 114/244 |
| 3,966,171 | A * | 6/1976 | Hale | B63G 8/42 254/311 |
| 7,983,114 | B2 * | 7/2011 | Ricard | B63B 21/66 367/154 |
| 9,001,623 | B1 | 4/2015 | Sharp et al. | |
| 9,751,596 | B2 * | 9/2017 | Borel | B63G 8/42 |
| 2015/0239530 | A1 | 8/2015 | Borel | |

FOREIGN PATENT DOCUMENTS

| | | |
|---|---|---|
| FR | 2 994 559 A1 | 2/2014 |
| JP | H9-21659 A | 1/1997 |
| WO | 2017/054795 A1 | 4/2017 |

* cited by examiner

UNDERWATER DEVICE AND UNDERWATER SYSTEM

CROSS-REFERENCE TO RELATED APPLICATIONS

This application is a National Stage of International patent application PCT/EP2020/061831, filed on Apr. 29, 2020, which claims priority to foreign French patent application No. FR 1905720, filed on May 29, 2019, the disclosures of which are incorporated by reference in their entirety.

The field of the invention is that of the stowage of underwater devices on winches on board surface vessels. It concerns more particularly the stowage of underwater devices intended to be towed by the surface vessel and comprising a traction cable, a flexible elongate body intended to be towed by the traction cable, and a towed body situated between the traction cable and the flexible elongate body.

BACKGROUND

The invention more particularly concerns the field of the stowage of underwater devices of the active sonar type comprising a heavy traction cable connected to a towed body incorporating an acoustic transmit antenna and connecting the traction cable to a flexible elongate body comprising a linear acoustic receiving antenna. The towed body may be a volume body suspended from the traction cable or capable of assuming an elongate shape along a longitudinal axis and incorporating a linear transmit antenna comprising transducers distributed along the longitudinal axis.

The traction cable and the linear receiving antenna, unlike the towed body, generally rigid, incorporating the transmit antenna, have the advantage of being capable of being easily wound around a winch.

Consequently, in the case of a transmit antenna integrated into a hydrodynamically profiled volume body, recovery and stowage of the combination are effected by winding the traction cable onto a drum of a winch, raising the volume body on board, detaching the volume body from the traction cable and from the linear receiving antenna, and then attaching the traction cable to the flexible elongate body. The linear receiving antenna is finally wound around the same drum as the traction cable, while the volume body is stowed separately on the deck of the ship.

It can be seen that, by virtue of its heterogeneous structure, a system of the above kind proves relatively difficult to deploy, to recover and to stow. It further necessitates the intervention of human operatives, in particular for the various operations of attaching and detaching the volume body, with the result that the deployment of such an assembly in bad weather is not only difficult but also potentially dangerous for the physical integrity of the operatives. This solution involving human operatives can moreover not be automated, which prevents its use from an autonomous surface vehicle also known as an unmanned surface vehicle (USV).

One solution for limiting the risks to humans is to use crane-type equipment that enables the volume body or a linear transmit antenna to be recovered directly in the water or on leaving the water and/or to provide automated means for carrying out the detachment of the volume body. However, this type of implementation is costly and complex. An example of a solution of this type is disclosed in the document U.S. Pat. No. 9,001,623. That solution comprises a winch around which the cable is wound and a support behind the winch on which the transmit antenna is placed with its longitudinal axis substantially horizontal and perpendicular to the rotation axis of the winch, after which the receiving antenna is wound around the winch after disconnection of the linear transmit antenna by automatic means. However, this type of handling device does not enable stowage of the sonar on small platforms, the transmit antenna occupying a space of great length along the axis of the carrier ship, behind the winch.

Another alternative is to tow the two antennas independently of one another each with its independent traction cable and its independent winch. However, this alternative is much more bulky and costly and is not compatible with small platforms.

The patent application FR 2 925 231 filed by the applicant discloses a handling device comprising a single winch coupled to a sonar in which the flexible linear transmit antenna is configured and fixed to the traction cable and to the receiving antenna so as to extend vertically during towing and so as to come to be wound around a drum of the winch, just like the traction cable and the receiving antenna. However, the operational use of this solution necessitates adjustments and is dedicated to a lightweight antenna that is difficult to produce with a good level of performance, the costly electro-acoustic transducers enabling transmission with a better sound level.

The patent application FR 2994559 filed by the applicant discloses a handling device comprising a winch configured to receive a transmit antenna in the form of a volume body suspended from the cable in the space delimited by the drum of the winch after winding the traction cable around the drum and afterwards enabling the linear receiving antenna to be wound around the drum. However, this solution is not suitable for the stowage of rigid linear transmit antennas and is reserved for a compact transmit antenna emitting acoustic energy that is not focused on a horizontal plane and has lower energy efficiency.

SUMMARY OF THE INVENTION

An object of the invention is to limit at least one of the aforementioned disadvantages.

To this end, the invention has for object a handling device intended to be installed on a surface vessel to enable stowage and deployment of an underwater device intended to be towed by the surface vessel and including a traction cable, a flexible elongate body and an assembly comprising at least one towed body situated between the flexible elongate body and the traction cable and intended to be towed by the traction cable. The handling device comprises a winch comprising a frame intended to be attached to a structure of the surface vessel and a first drum capable of turning relative to the frame about a first rotation axis and an assembly comprising at least one second drum which surrounds the first drum and is capable of turning relative to the frame about a second rotation axis substantially parallel to the first rotation axis. The winch is capable of being in a decoupled state in which the first drum and the second drum are rotationally decoupled about the first rotation axis and the second rotation axis so as to allow the traction cable to be wound around the first drum during a first winding step in which the first drum is rotated about the first axis, the second drum being capable of being in an open state in which the second drum has a receiving opening that the towed body is capable of passing through in order to enter the interior of the space that surrounds the first drum and that is surrounded by the second drum. The winch is capable of being in a coupled state in which the first drum and the second drum are rotationally coupled about the second rotation axis so as to allow the flexible elongate body to be wound around the second rotation axis during a second winding step in which the second drum is rotated about the second axis.

The handling device advantageously has at least one of the features listed hereinafter, separately or in combination.

Advantageously, the second drum is capable of being in a receiving angular position about the second axis relative to the frame in which the receiving opening is intended to have the traction cable and the towed body passed through it during the first winding step.

Advantageously, the receiving opening is elongate along the first rotation axis.

The first drum and the second drum may be concentric.

Alternatively, the second rotation axis is at a distance from the first rotation axis.

The second drum may be capable of being alternately in the open state and in a closed state in which the receiving opening is at least partly closed. Alternatively, the second drum is only capable of being in the open state.

The handling device advantageously comprises a traverse winding device that is capable of ordering winding of the traction cable on the winch, the traverse winding device comprising two lateral deflectors spaced along the first rotation axis, the traverse winding device being capable of being in a traverse winding state in which a small distance separates the lateral deflectors along the first rotation axis and in a receiving state in which a greater distance separates the deflectors.

The handling device may comprise one or more second drums.

In one particular embodiment, at least one second drum comprises a cap mobile relative to a first part of the second drum, the cap being capable of being in a first position in which the cap opens the second drum so that it comprises the receiving opening and in a second position in which the cap substantially closes the receiving opening so that the second drum has a substantially cylindrical shape.

The invention also relates to an underwater system comprising the handling device and the underwater device.

In one particular embodiment, the towed body integrates an antenna for emission of acoustic waves and the flexible elongate body comprises a receiving antenna comprising a plurality of electro-acoustic transducers distributed along the flexible elongate body.

In one example, the towed body is a body elongate along a longitudinal axis, the transmit antenna comprising a plurality of electro-acoustic transducers distributed along the longitudinal axis.

In another example, the towed body is a compact hydrodynamic body having a flattened general shape and being suspended from the traction cable when the handling device is deployed.

Advantageously, the handling device is configured so as to enable stowage of the towed body in a space that surrounds the first drum. This space is surrounded by the second drum without the towed body exiting the space radially.

Advantageously, the underwater system is configured so that, during the first winding step, the towed body passes through the receiving opening in an orientation in which the longitudinal axis I is substantially parallel to the first rotation axis x1 and/or so that the towed body 4 arrives in the vicinity of the carrier vessel in the orientation in which the longitudinal axis I is substantially parallel to the first rotation axis x1.

Advantageously, the handling device is configured to execute the following steps during a method of stowing the initially deployed underwater device:
the first winding step in which the first drum of the winch, being in the decoupled state, is rotated about the first rotation axis relative to the frame so as to come to wind the traction cable around the first drum, the traction cable passing through the receiving opening, and so that the towed body enters into the space delimited by the second drum through the receiving opening,
followed by a winding step in which the second drum of the winch, being in the coupled state, is rotated about the second rotation axis so as to wind the flexible linear element around the second drum.

The underwater device may comprise one or more towed bodies.

BRIEF DESCRIPTION OF THE DRAWINGS

Other features and advantages of the invention will become apparent on reading the following detailed description given by way of nonlimiting example and with reference to the appended drawings, in which.

The same elements are identified by the same references from one figure to another.

DETAILED DESCRIPTION

Figure 1:
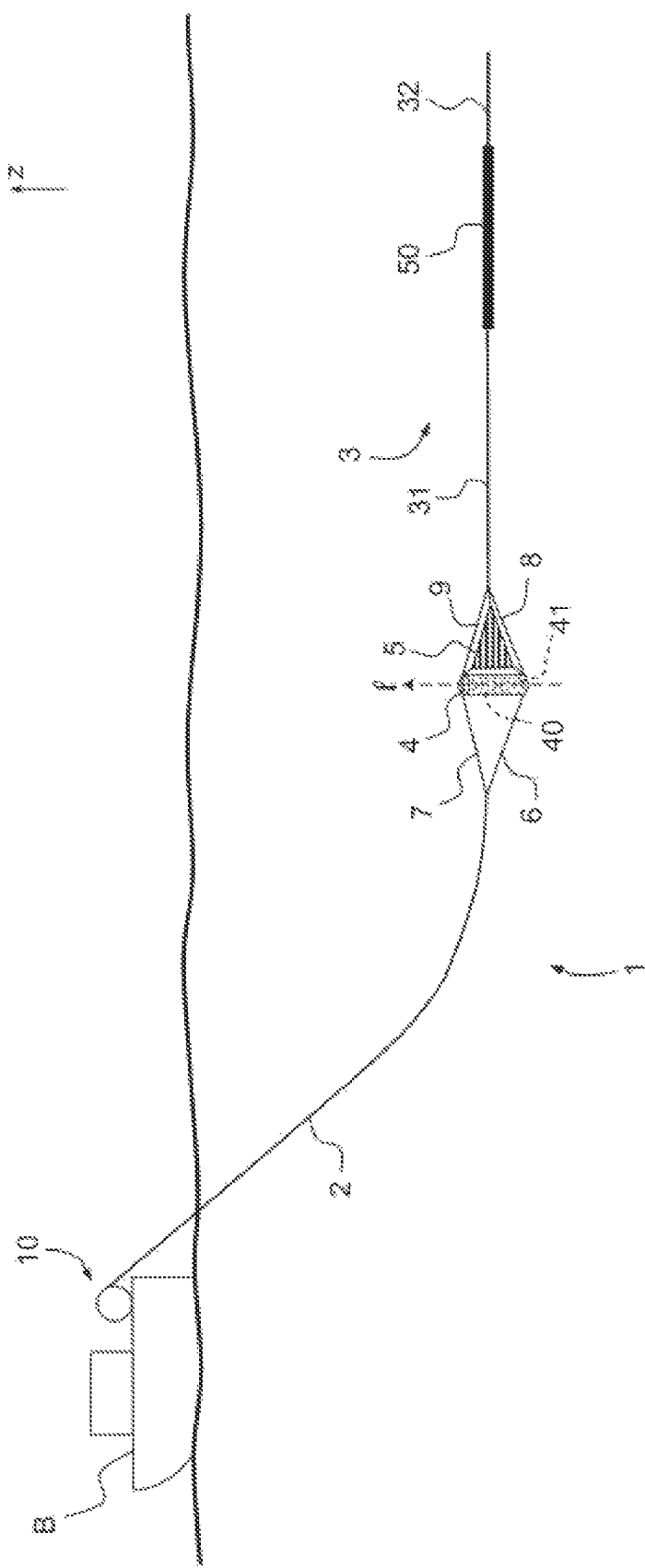
FIG. 1 represents schematically an underwater system according to the invention comprising a handling device according to the invention and an underwater device.

As can be seen in FIG. 1, the invention relates to a handling device 10 using a winch capable of stowing an underwater device 1 intended to be installed on a surface vessel B intended to tow the underwater device 1 via the handling device 10.

The invention more particularly concerns a handling device 10 capable of stowing an underwater device 1 of the type comprising a traction cable 2, a flexible elongate body 3 intended to be towed by the traction cable 2, and a towed body 4. The traction cable may for example be a bare cable, a sheath cable or a faired cable.

The traction cable 2 advantageously has a negative buoyancy. It is then referred to as a heavy cable. The weight of the cable then enables the towed body to be positioned at depth.

The towed body 4 is disposed between the traction cable 2 and the flexible elongate body 3. In other words, the traction cable 2 is connected to the flexible elongate body via the towed body 4. As a result, the towed body is intended to be towed, in the submerged state, by the traction cable 2 and reaches the handling device 10 after the traction cable 2 and before the flexible elongate body 3 during stowage on board the surface vessel of the underwater device 1 initially deployed and towed by the surface vessel B. The stowage method enables the underwater device to come to be stowed by the handling device 10 on board the surface vessel B. The problem arises of simple and compact stowage of this type of underwater device.

The towed body 4 may for example have an elongate shape so as to extend longitudinally along a longitudinal axis I, as in the FIG. 1 example. The longitudinal axis I is for example intended to extend along a vertical axis z during towing. The vertical axis z is defined by the force of gravity. It is an axis substantially perpendicular to the surface of the sea in a calm sea that then defines a horizontal plane. This type of elongate object has dimensions much smaller along the longitudinal axis than in the two other orthogonal directions perpendicular to the longitudinal axis.

The elongate body has for example a dimension greater than the diameter of the traction cable in a plane perpendicular to the longitudinal axis of the traction cable and to that of the flexible elongate body in the vicinity of the towed body.

Alternatively, the towed body takes for example the form of a so-called compact hydrodynamic body suspended from the traction cable and having a flattened general shape, that is to say having greater dimensions in two orthogonal directions of a horizontal plane than along a vertical axis when that body 4 is towed by the traction cable 2.

The handling device is in particular intended to stow an underwater device of the active sonar system type comprising a negative buoyancy traction cable 2, a towed body 4 integrating an antenna 40 for emission of acoustic waves and a neutral buoyancy flexible elongate body 3 comprising a linear receiving antenna 50 comprising a plurality of electro-acoustic transducers distributed along the flexible elongate body 3. The flexible elongate body 3 comprises a neutral buoyancy intermediate cable 31 connecting the neutral buoyancy receiving antenna 50 to the towed body 4 and/or a neutral buoyancy trailing line 32 connected to the towed body 4 and/or to the intermediate cable 31 via the receiving antenna 50.

The towed body 4 is for example an elongate body extending longitudinally along a longitudinal axis I and incorporating a linear transmit antenna 40 comprising a plurality of electro-acoustic transducers 41 distributed along the longitudinal axis I. In other words, this towed body 4 is intended not to be deformed while it is being towed, during its recovery on board the surface vessel and during its stowage on board the surface vessel.

Figure 2:
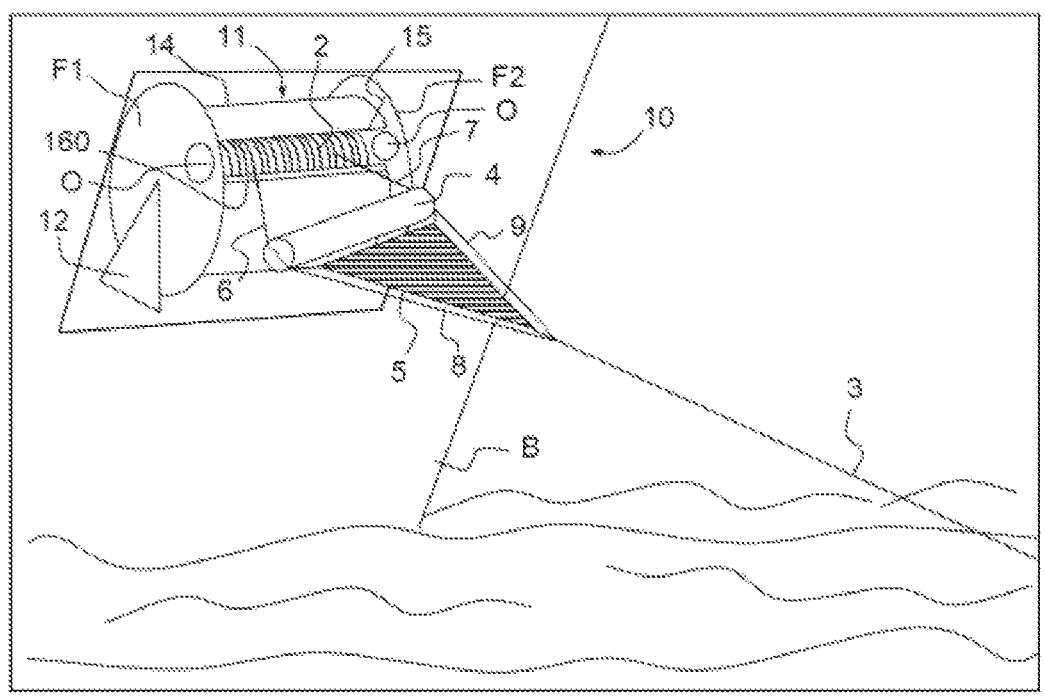
FIG. 2 represents schematically a first embodiment of a handling device according to the invention.

A linear transmit antenna is conventionally intended to be towed in a vertical orientation in which the longitudinal axis I is vertical so as to emit acoustic waves mainly in a horizontal plane as represented in FIG. 1. The handling device and the underwater device may be configured so that the towed body 4 incorporating this type of antenna approaches a drum of the handling device around which the traction cable 2 has just been wound in an orientation in which its longitudinal axis I is substantially parallel to a rotation axis of the drum, as represented in FIG. 2 and as will emerge hereinafter. To this end, the towed body 4 is for example connected to the cable 2 and to the flexible elongate body 3 via hangers 6, 7, 8, 9.

In the nonlimiting embodiment in the figures, the towed body 4 is rigid so as not to be deformed during its use, that is to say during towing of the submerged sonar device, during recovery of the underwater device and during launching thereof.

Figure 11:
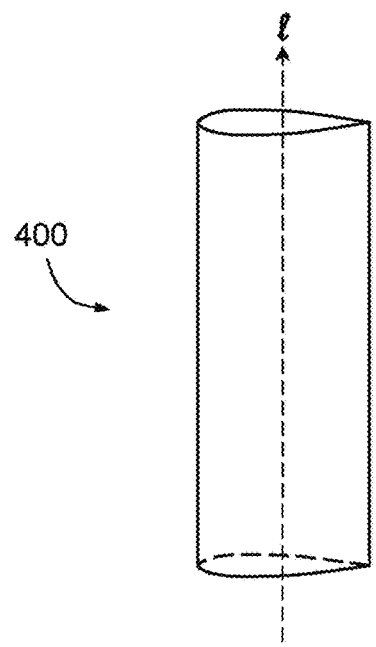
FIG. 11 represents schematically an example of a towed body of different shape to that from FIGS. 1 to 7.

The towed body 4 may be cylindrical or hydrodynamically profiled. It may have a water droplet overall shape in a plane substantially perpendicular to the axis I like the towed body 400 represented in FIG. 11.

Figure 5:
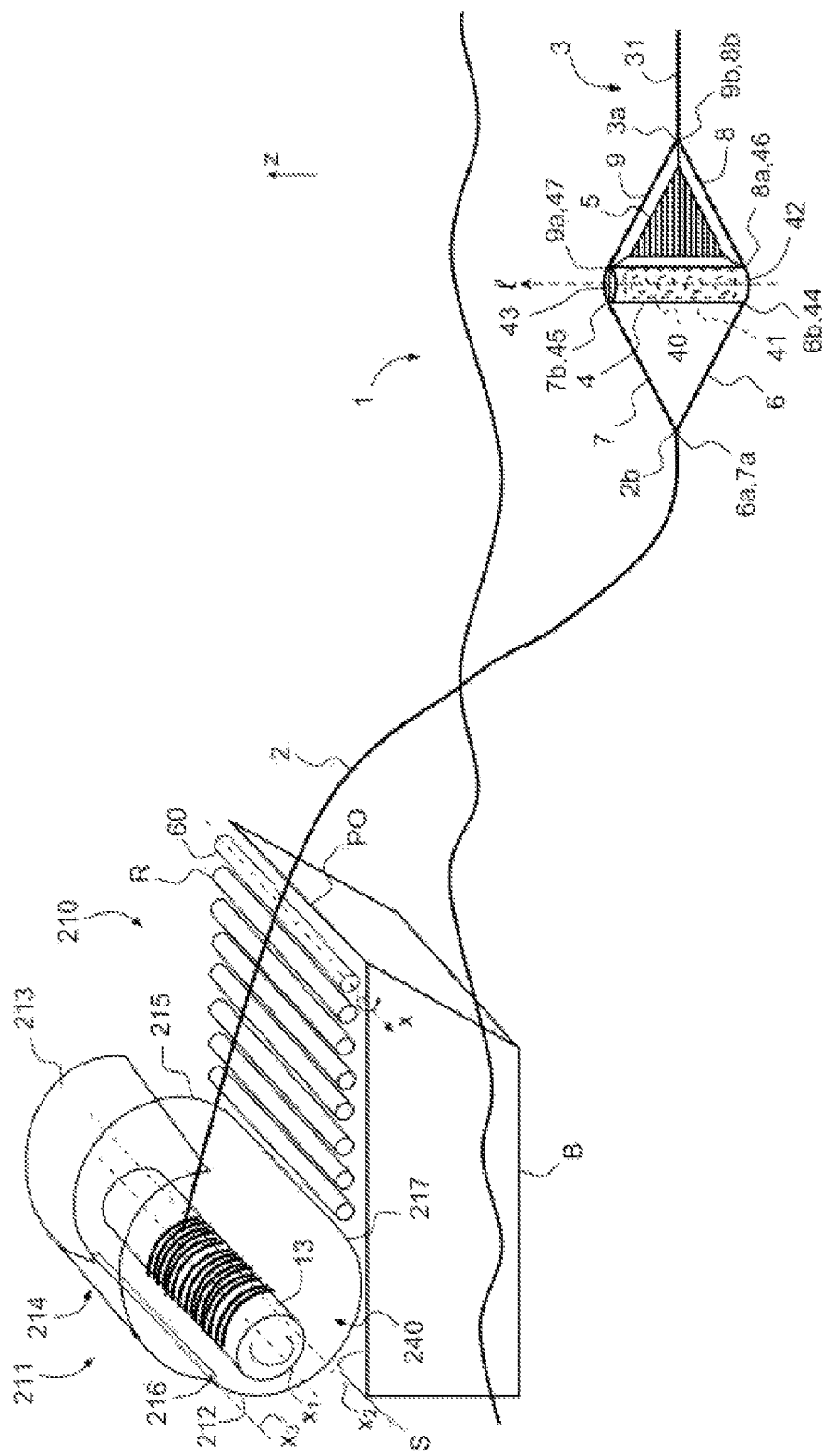
FIG. 5 represents schematically an underwater system comprising a handling device according to a second embodiment during a phase of towing the underwater device.

It may be provided with a hydrodynamic coating having, in a nonlimiting manner, a sail shape 5 as can be seen in FIG. 5. This coating has not been represented in FIGS. 6 and 7 for greater clarity. The sail 5 is for example installed between hangers 8 and 9 connecting the towed body 4 to the flexible elongate body 3. This sail enables limitation of vibrations induced by vortices. Other types of hydrodynamic coating may be provided such as for example jackets provided with hairs or inflatable sails.

A transmit antenna may alternatively be incorporated in a compact body suspended from the traction cable 2 when the underwater device is deployed.

The following description describes the features of the handling device according to the invention in its application to the stowage of an active sonar with a linear transmit antenna. This particular application makes it possible to highlight the advantageous nature of the invention in general. The features described here are in no way specific to this particular application and form an integral part of the invention whatever the application considered.

Figure 3:
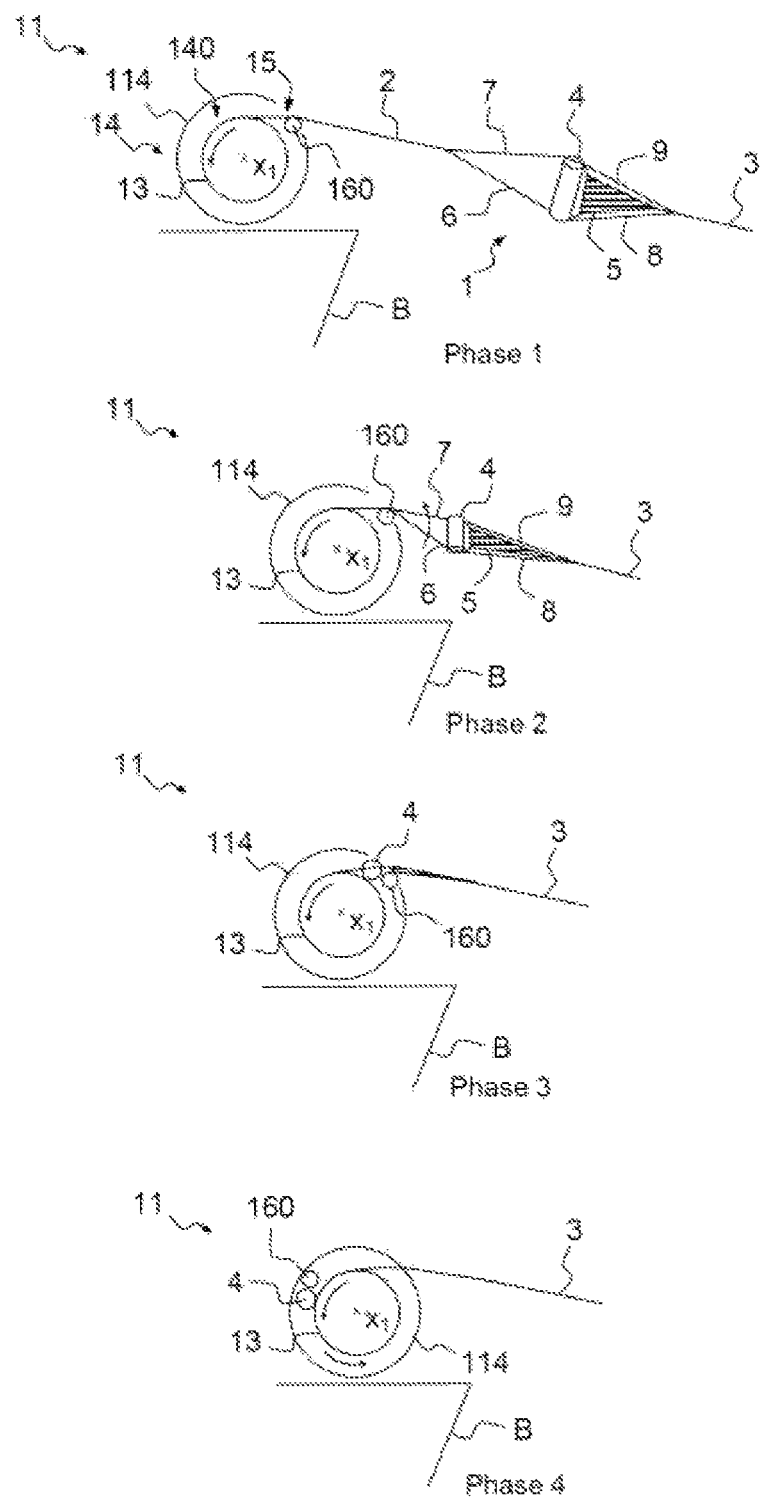
FIG. 3 represents schematically different phases of a method of stowing or of recovering an underwater device by means of the handling device according to the invention.

An example of an underwater system comprising a handling device 10 according to the invention is represented schematically in perspective in FIG. 2 and in side view in FIG. 3 in successive phases 1 to 4 of a method of stowing the underwater device 1 by means of the handling device 10 so that the underwater device comes to be on board the surface vessel. It is to be noted that FIG. 2 represents a phase situated between the phases 2 and 3 that can be seen in FIG. 3.

The handling device 10 comprises a winch 11 comprising a frame 12 that can be seen only in FIG. 2. The frame 12 is intended to be fixed to a structure S of the surface vessel B.

In accordance with the invention, the winch 11 comprises a first drum 13 that is capable of turning relative to the frame 12 about a first rotation axis x1 and a second drum 14 that surrounds the first drum 13 and is capable of turning relative to the frame 12 about a second rotation axis x2. The drums 13 and 14 are concentric in the nonlimiting embodiment from FIGS. 2 and 3 and so the axis x2 is the axis x1.

The second drum 14, surrounding the first drum 13, has a greater diameter than the first drum 13.

The winch 11 is capable of being in a decoupled state in which the first drum 13 is capable of being rotated about the rotation axis x1 relative to the frame 12 and is decoupled from the second drum 14 in rotation about the first rotation axis x1 and about the second rotation axis x2.

This enables the traction cable 2 to be wound around the first drum 13 during a first winding step in which the first drum 13 is rotated about the first axis x1 relative to the frame 12.

The second drum 14 is, at least when the winch is in the decoupled state, capable of being in an open state, as represented in FIGS. 2 and 3 (phases 1 and 2) in which the second drum 14 offers up a receiving opening 15. The receiving opening 15 is able to have the towed body 4 passed through it so as to penetrate into the interior of the space 140 delimited by the drums 13 and 14. This space surrounds the first drum 13 and is surrounded by the second drum 14.

The second drum 14 delimits a substantially cylindrical internal space the diameter of which corresponds to the diameter of the second drum.

The winch 11 is capable of being in a coupled state in which the first drum 13 and the second drum 14 are coupled in rotation about the second rotation axis x2.

The drums 13 and 14 preferably rotate together about the second axis when the winch 11 is in the coupled state.

Accordingly, by rotating the second drum 14 relative to the frame 12 about the axis x2 when the winch 11 is in the coupled state, once the towed body 4 is stowed in the space 140 the flexible elongate body 3 comes to be wound around the second drum 14.

Accordingly, the handling device 10 according to the invention enables stowage in a limited space and on a single winch 11 of a traction cable 2 and an active sonar with a linear transmit antenna 3, 4. The handling device according to the invention enables stowage of the traction cable 2 around the first drum 13, with the linear transmit antenna in the space 140.

This invention is of particular interest when the towed body 4 has at least one dimension greater than that of the cable and that of the flexible elongate element in a plane perpendicular to the longitudinal axis of the cable in the vicinity of the towed body or is incapable of being wound around drums because of a certain stiffness in bending.

This handling device is less costly, less bulky and less heavy than a device that comprises separate winches for the stowage on the one hand of the traction cable and on the other hand of the flexible elongate body.

Generally speaking, the invention is of particular interest for the stowage on board the surface vessel B of underwater devices of the type from FIGS. 2 and 3 comprising a towed body 4 intended to be stowed without being deformed, starting from a totally submerged initial situation. The invention is particularly suitable for the stowage of this type of underwater device when the underwater device and the handling device are configured so that the towed body 4 is able to pass through or passes through the opening 15 during the first winding step, for example to come to bear on the first drum 13 around which the traction cable 2 has just been wound, in an orientation in which its longitudinal axis I is substantially parallel to a rotation axis x1 of the first drum 13.

In fact, the shape of a drum 14 enables the provision of a receiving opening 15 having a slot shape extending longitudinally along the axis x1 as represented in FIGS. 2 and 3 and through which an elongate towed body 4 is able to pass with its longitudinal axis substantially parallel to the axis x1 during the first winding step without suffering any deformation. The device therefore enables the production of towed bodies with a linear transmit antenna that are relatively long and heavy and non-deformable.

As can be seen in FIGS. 2 and 3, the receiving opening 15 advantageously (but not necessarily) extends over substantially all the length of the second drum 14 along the first rotation axis x1. Alternatively, the receiving opening 15 extends over a part of the length of the second drum 14 along the first rotation axis x1.

The second drum 14 is advantageously capable of being positioned and preferably immobilized in an angular receiving position about the second axis x2 in which the receiving opening 15 has the traction cable 2 passed through it during the first winding step, as can be seen in FIGS. 2 and 3. The cable 2 and the towed body being able to penetrate into the space 140 through the same receiving opening 15, the stowage of the underwater device does not necessitate any manual or automatic operation to detach the towed body 4 from the traction cable 2.

A common plane perpendicular to the axis x1 is advantageously situated at equal distances from the two longitudinal ends of the first drum 13 and at equal distances from the two longitudinal ends of the second drum 14.

The first drum 13 and the second drum 14 advantageously have the same length along the axis x1. The second drum 14 surrounds the first drum over all the length of the first drum 13 along the axis x1. Alternatively, the drums 13 and 14 are offset relative to one another along the axis x1.

Alternatively, the second drum 14 is longer than the first drum 13 along the axis x1 which enables winding of a greater length of the flexible elongate body 3 or, conversely, the second drum 14 is shorter than the first drum 13 along the axis x1, which enables winding of a greater length of the traction cable 2.

The towed body 4 is advantageously capable of penetrating into the space 140 through the receiving opening 15 in order to be stowed in the space 140 without exiting the space 140 radially (relative to the axis x2). In other words, the towed body 4 is inside the cylinder having the diameter of the second drum, formed around x2 over all the length of the second drum. The winding of the flexible elongate body 3 around the second drum 14 after stowing the towed body 4 in the space 140 is then not impeded by the towed body 4.

The towed body 4 is advantageously capable of penetrating into the space 140 through the receiving opening 15 in order to be stowed in the space 140 without exiting the space 140 radially (relative to the axis x2) once the traction cable has been wound around the first drum 13.

Figure 7:
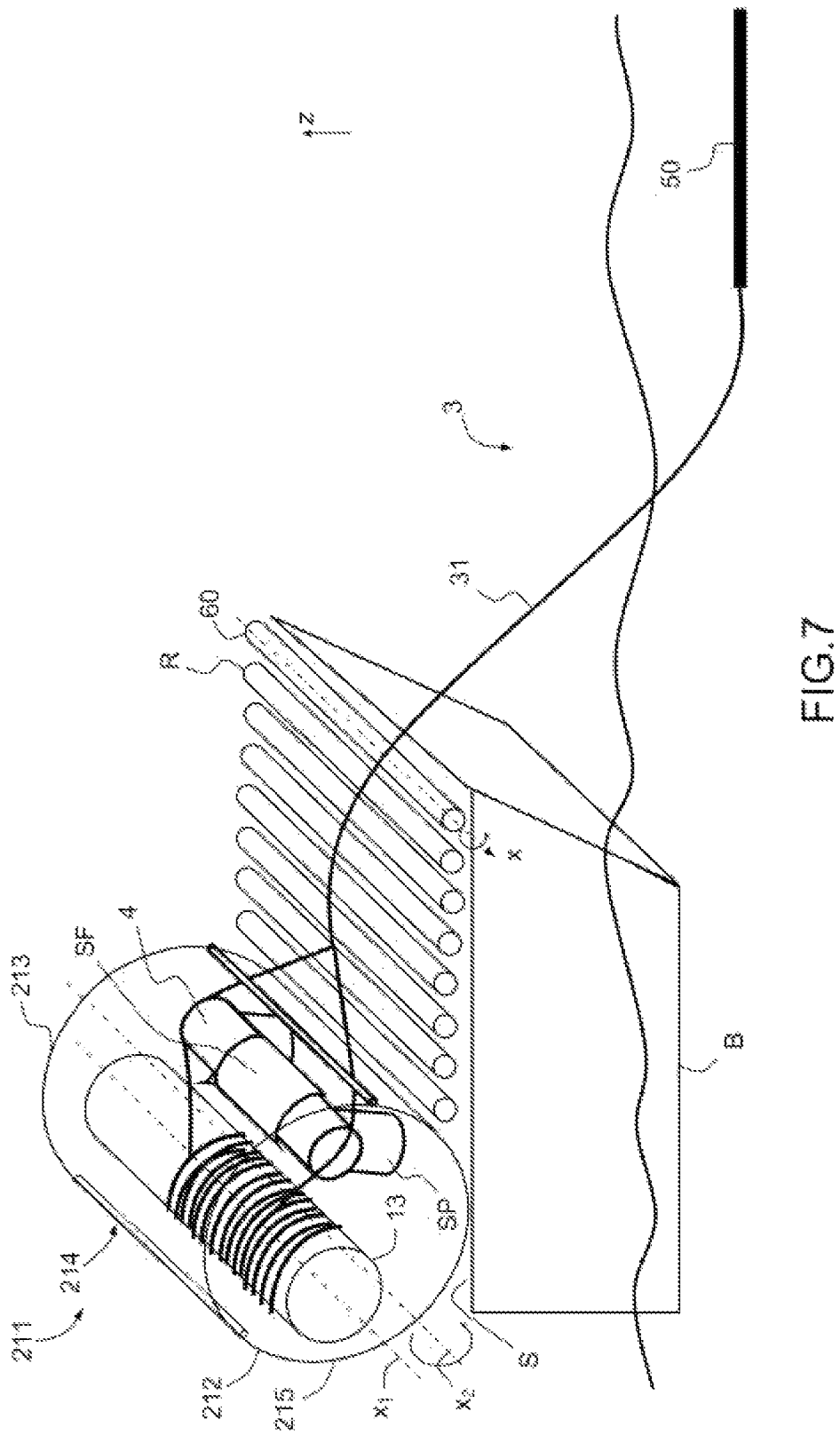
FIG. 7 represents schematically an underwater system comprising a handling device according to a second embodiment during a phase of stowing of the underwater device by the handling device.

In FIGS. 3 and 7 the towed body 4 is capable of being stowed entirely in the space 140. Alternatively, the towed body 4 could project from the space 140 along the axis x2, for example, when the towed body 4 is longer than the second drum 14.

The invention also relates to a method of stowing and to a method of deploying the underwater device both capable of being carried out by the handling device according to the invention. The handling device can be configured to carry out these methods when a condition of recovery or of launching is verified, for example when a control device of the handling device receives a stowage command or respectively a deployment command.

Figure 4:
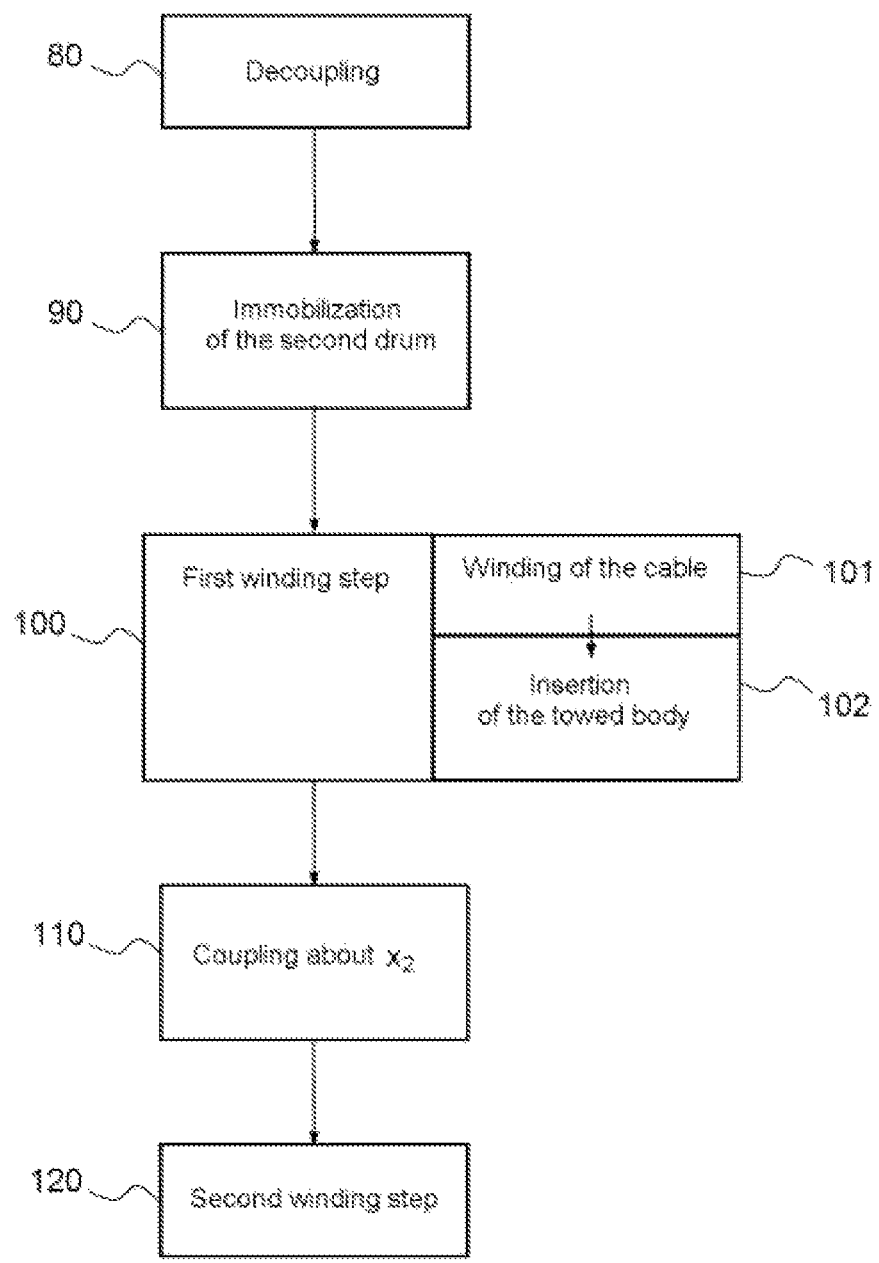
FIG. 4 represents schematically a diagram of the steps of a stowage method according to the invention.

The stowage (or recovery) method comprises different phases represented in FIGS. 2 and 3 and repeated in FIG. 4.

The method of stowing (or of recovering) the underwater device initially deployed and connected to the first drum via the traction cable 2 comprises:
   a first winding step 100 during which the winch 11 is in the decoupled state, the first drum 13 being rotated about the rotation axis x1 relative to the frame 12 so as to come to wind the traction cable 2 around the first drum 13 in a step 101 (phases 1 and 2 in FIG. 3), the traction cable 2 passing through the receiving opening 15 or, in a less advantageous variant, through another opening formed in the second drum 14, a step of insertion of the towed body 4 in the space 140 during a step 102 (phase 3 in FIG. 3), through the receiving opening 15, a second winding step 120 (phase 4 in FIG. 3) during which the winch 11 is in the coupled state, the second drum 14 being rotated about the second rotation axis x2 so that the flexible linear element 3 comes to be wound around the second drum 14.

In a first instance the step 102 may be a second sub-step 102 of the first winding step 100 or, in a second instance, a step distinct from the first winding step 100.

In other words, in a first instance, when the winch 11 is in the decoupled state, the first drum 13 being rotated about the rotation axis x1, the traction cable 2 comes to be wound around the first drum 13 (phases 1 and 2 in FIG. 3), passing through the receiving opening 15, after which the towed body 4 passes through the receiving opening 15 because the first drum 13 is rotated about the rotation axis x1 (phase 3 in FIG. 3), to penetrate into the space 140 delimited by the second drum 14.

To this end, the second drum 14 is capable of being positioned, and preferably immobilized, in a so-called receiving angular position about the axis x2 in which the receiving opening 15 can have the traction cable 2 and the towed body 4 passed through it during the first winding step. The receiving opening 15 must then be sized so that the towed body is able to pass through it during the first winding step as a function of the orientation in which it is offered up relative to the opening.

If the first winding step continues, the towed body 4 advantageously comes to bear on the first drum 13 because of the first drum 13 being rotated about the axis x1.

During the second winding step 120, the second drum 14 is rotated about the axis x2 in the same direction as the first drum 13 during the first winding step 100.

The method of stowing an initially deployed underwater device is therefore easily automatable, which makes it possible to avoid the intervention of a human operative and the associated risks and enables the stowage of the underwater device on board a USV.

In the second instance the towed body 4 does not penetrate into the space 140 through the receiving opening 15 because of the first drum 13 being rotated about the axis x1. The step 102 of insertion of the towed body 4 in the space 140 through the receiving opening 15 can be carried out after the first winding step, for example, by a human operative or a machine.

A diagram of the stowage method employed in the first instance is represented in FIG. 4. This method comprises the following steps carried out in the following order:

decoupling 80 the first drum 13 from the second drum 14 in rotation about axes x1 and x2 relative to the frame 12 to place the winch 11 in the decoupled state, which step is carried out by coupling/decoupling means of the winch 11, immobilizing 90 the second drum 14 in the open state against rotation relative to the frame 12 about its rotation axis x2 in the receiving angular position, which step is carried out by immobilization means, such as a brake for example, a centering finger or a gear, the first winding step 100 comprising the first sub-step 101 of winding the traction cable and the sub-step 102, a step 110 of coupling the first drum 13 and the second drum 14 in rotation about the second rotation axis x2 relative to the frame 12 to place the winch 11 in the coupled state; this step is carried out by the coupling/decoupling means, the second winding step 120.

In the embodiment from FIGS. 2 and 3, the drums 13 and 14 are concentric. This embodiment makes it possible to propose a simple and lightweight handling device. The two drums can for example be rotated relative to the frame when the winch is in the decoupled state and in the coupled state by the same shaft itself rotated by a single motor. The coupling/decoupling means can be implemented in a very simple manner by mounting the first drum rigidly connected to the shaft, mounting the second drum with a pivot connection on the first shaft, and providing a coupler enabling the second drum alternately to be rigidly connected to the shaft and free to rotate about the rotation axis x1 relative to the shaft.

Just like the first coupling/decoupling means that will be described hereinafter, the coupling/decoupling means are for example means that are conventional for the person skilled in the art, for example in the form of a clutch or based on a brake coupled to a jaw rigidly connected to one of the parts or on a motor coupled to a toothed ring or again a connecting pin.

The handling device with concentric drums is particularly suitable for stowing an underwater device 1 including a towed body 4, for example a linear transmit antenna, taking the form of a cylindrical object of circular or non-circular section, for example a substantially water-droplet-shaped section. The cylindrical towed body 4 can come to bear on a turn of the traction cable 2 previously produced around the first drum 13 on each turn of a layer of that winding, which favors good stability of the towed body 4 on the first drum 13.

When during the first winding step a towed body 4 comes to bear on the first drum 13 because the first drum is being rotated, that is to say because of the traction exerted on the towed body by the cable 2 during this rotation, either directly or via an attachment system connecting the towed body to the cable, the traction exerted by the cable holds the body pressed onto the first drum 13 without it being necessary to provide fixing means for fixing the towed body 4 to the first drum 13. This traction is maintained during the second winding step. This avoids human intervention to carry out this fixing or costly means for protecting the body from any impacts that might be caused by destabilization of the body. Moreover, this type of towed body can be stowed in the compact space formed around the drum 13.

The handling device is capable of executing a method of deploying the device according to the invention initially stowed by the handling device. The deployment method comprises the following steps:

a first deployment step during which the second drum 14 of the winch 11 in the coupled state is rotated about the second rotation axis so as to unwind the flexible elongate body from the second drum 14, a step of extracting the towed body 4 from the space delimited by the second drum 14, a second deployment step during which the first drum 13 of the winch 11 in the decoupled state is rotated about the rotation axis x1 relative to the frame 12 so as to come to unwind the traction cable 2 from the first drum 13.

The first deployment step is advantageously preceded by the coupling step 110 and the step of extraction of the towed body is advantageously preceded by the decoupling step 80 and where appropriate by the immobilization step 90.

The step of extraction of the towed body can form part of the second deployment step. That second deployment step is then carried out by rotating the first drum 13 about the first axis x1 so that the towed body comes to be extracted from the space delimited by the second drum 14 through the receiving opening 15 then so as to unwind the traction cable 2 from the first drum 13.

Alternatively, the extraction step may precede the second deployment step.

Figure 6:
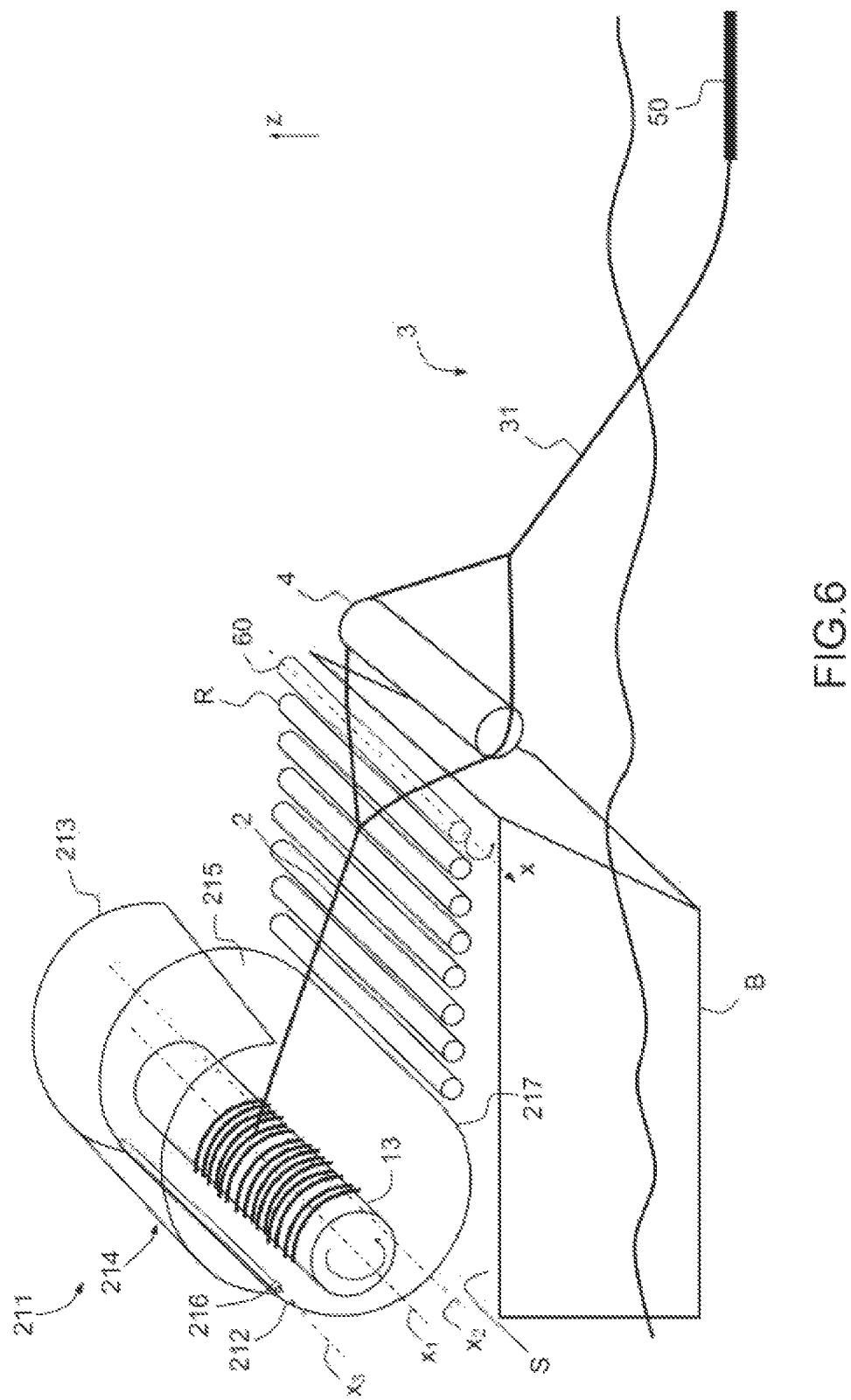
FIG. 6 represents schematically an underwater system comprising a handling device according to a second embodiment during a phase of recovery of the underwater device by the handling device.

In the second embodiment represented in FIGS. 5 to 7, the winch 211 differs from the winch 11 in the preceding figures in that the axis x1 is at a distance from the axis x2. This embodiment enables stowage in the space delimited by the second drum 214 of an object with larger dimensions in the plane perpendicular to the axis x1 without having to increase the diameter of the second drum 214 significantly and/or stowage of a towed body of complex shape.

The axes are for example spaced apart along an axis that is horizontal in a calm sea and perpendicular to the axis x1.

The first drum 13 is for example mounted to rotate about a shaft with axis x1 fixed to the second drum 214, for example to a shell 212 of the second drum 214. The shell 212 will be described hereinafter.

The coupling/decoupling means can comprise first coupling/decoupling means enabling alternate fastening and unfastening of the first drum 13 to/from the shaft on which it is mounted and means for immobilization of the second drum about the axis x2 relative to the frame 12 enabling alternating fastening and unfastening of the second drum from the frame in rotation about the axis x2. The decoupled state is obtained by decoupling the first drum 13 from the shaft about the axis x1 and by immobilization of the second drum 214 about the axis x2 relative to the frame 12. The coupled state is obtained by coupling the first drum 13 to the shaft. A first motor is provided to enable the first drum 13 to be rotated about the axis x1 relative to the frame. A second motor is provided to enable the second drum 214 to be rotated about the axis x2 relative to the frame.

In the embodiment from FIGS. 2 and 3, the second drum 14 has, as can be seen in FIG. 3, a shell 114 having a globally cylindrical shell shape in which the receiving opening 15 is formed.

The drum 14 from FIGS. 2 and 3 is capable only of being in the open state. The second drum 14 is configured so that winding an elongate flexible element 3 around the second drum 14 is possible when the second drum 14 is in the open state.

The receiving opening 115 advantageously extends over an angle less than or equal to 20° and preferably less than or equal to 15° to enable correct winding of the flexible elongate body 3 around the second drum 14.

Alternatively, the winch 11 from FIGS. 2 and 3 could be capable of being alternately in the open state and in a closed state in which the receiving opening it at least partly closed, as represented in FIGS. 5 to 7. Winding the flexible elongate element is then possible either only in the closed state or in the closed state and in the open state.

In the embodiment from FIGS. 5 to 7, the handling device 210 differs from the handling device from FIGS. 2 and 3 in particular in that the second drum 214 is distinguished from the second drum 14 from FIGS. 2 and 3 in that it is capable of being alternately in an open state, as represented in FIGS. 5 and 6, in which it offers a receiving opening 215 through which the towed body 4 is able to pass to penetrate to the interior of the space 240 delimited by the second drum 214 and the first drum 13 and surrounding the first drum 13, and in a closed state, as represented in FIG. 7, in which the receiving opening 215 is at least partly closed. This could equally be the case for coaxial drums, just like the more specific features of the device and the method described hereinafter, separately or in combination. This type of configuration enables a large receiving opening to be formed in the drum and therefore towed bodies of large size to be received inside the space delimited by the second drum 214, for example in a plane perpendicular to the axis x2. Moreover, a large opening leaves more room for possible manipulation of the towed body by a machine or an operative.

The second drum 214 comprises a cap 213 mobile relative to a first part 212 of the second drum 214 and capable of being in a first position (FIGS. 5 and 6) in which the cap 213 opens the second drum 214 so that it comprises the receiving opening 215 and in a second position (FIG. 7) in which the cap 213 substantially closes the receiving opening 15 so that the second drum 214 has a substantially cylindrical shape. A residual slot advantageously allows the passage of a connecting zone between the towed body and the flexible elongate body 3 or the flexible elongate body 3.

In the nonlimiting example from FIGS. 5 to 7, the second drum 214 comprises a shell 212 having substantially the shape of an angular portion of a cylinder formed around the axis x2. The shell 212 extends angularly around the axis x2 from a first axial edge 216 substantially parallel to the axis x2 as far as a second axial edge 217 substantially parallel to the axis x2. The cap 213 has a shape substantially complementary to that of the shell 212 and is mounted to pivot relative to the shell 212 about a rotation axis x3 of the cap parallel to the axis x2 in the vicinity of the edge 216 so that the cap 213 is able to pass from the first position represented in FIG. 5 to the second position represented in FIG. 7 by rotation relative to the first part about the axis x3.

The stowage (or recovery) method comprises an opening step carried out by opening means or by an operative to cause the second drum to go from the closed state to the open state. This opening step may be carried out before the first winding step 100 or indeed during or after the first winding step but before the step 102. The method comprises, after the step 102 and before the step 120, a step of closing the second drum 214 to enable the winding of the elongate element 3 around the second drum after the step 101.

In the embodiment from FIGS. 5 to 7, the step 102 of insertion of the towed body 4 into the space 140 by passing it through the receiving opening 15 is carried out after the first winding step, for example, by a human operative or a machine. Alternatively, the step 102 is carried out during the first winding step because of the rotation of the first drum about the axis x1.

The handling device advantageously comprises fixing means SF, SP, as represented in FIG. 7, for fixing the towed body 4 to the second drum 214 and more particularly to the shell 212, configured to constrain the towed body to rotate with the second drum 14 about the axis x2. These fixing means comprise for example a support SP intended to support the towed body 4 and fixed relative to the shell 212 or relative to the cap and fixing means SF for fixing the towed body 4 to the support SP. Means of this type may equally be provided when the drums are coaxial.

The second drum 214 capable of being in the open state and in the closed state is for example configured, as in FIGS. 5 and 6, so that the winding of a flexible elongate body, for example of the body 3, around the second drum 214 is impossible in the open state and possible in the closed state.

Alternatively, the second drum is configured so that the winding of a cable around the second drum is possible in the open state and in the closed state. The cap is for example of the pivoting flap type having for example the shape of a portion of a cylinder with a diameter very slightly less than the diameter of the second drum and capable of pivoting about the axis x2 so as to come to close or to open the second drum.

As represented in FIG. 2, the winch may comprise two flanges F1, F2 delimiting the drums along the axis x1. At least one flange advantageously has an opening O enabling an operative to access the space 140 so as to enable maintenance of the towed body 4 stowed in the space 140. This type of means may equally be provided when the drums are coaxial.

Figure 8:
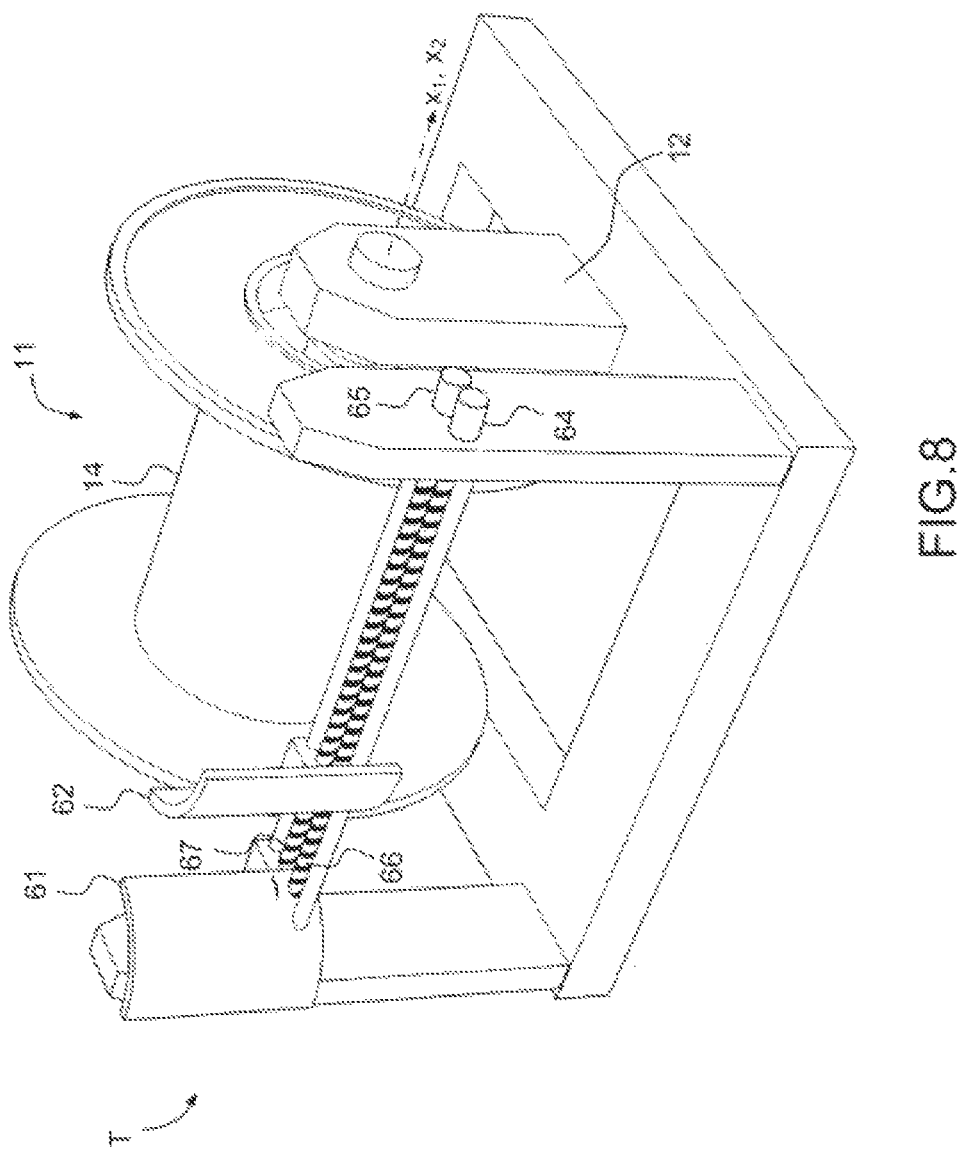
FIG. 8 represents schematically a traverse winding device of a handling device according to the invention in a traverse winding state.
Figure 9:
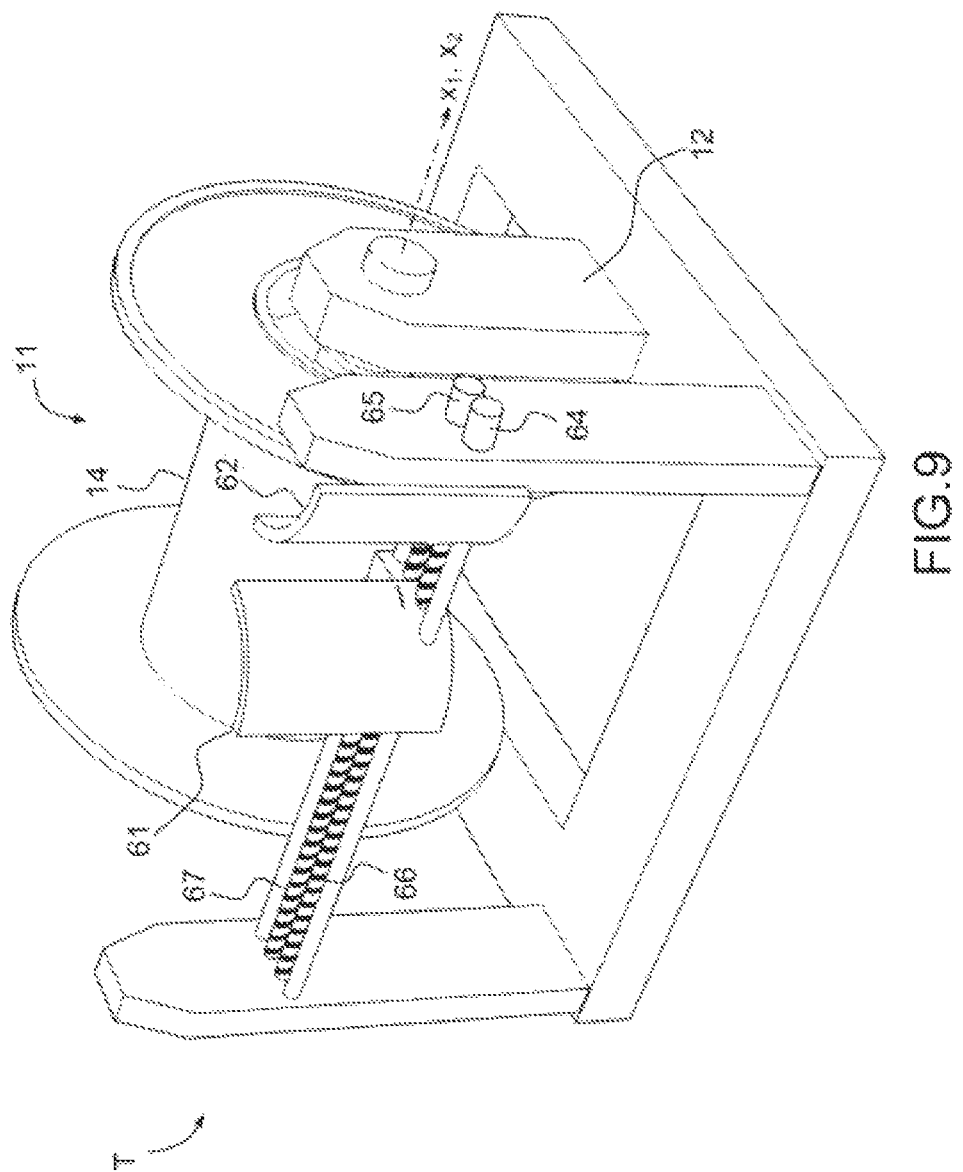
FIG. 9 represents schematically a traverse winding device of a handling device according to the invention in the traverse winding state after translation of the lateral deflectors.
Figure 10:
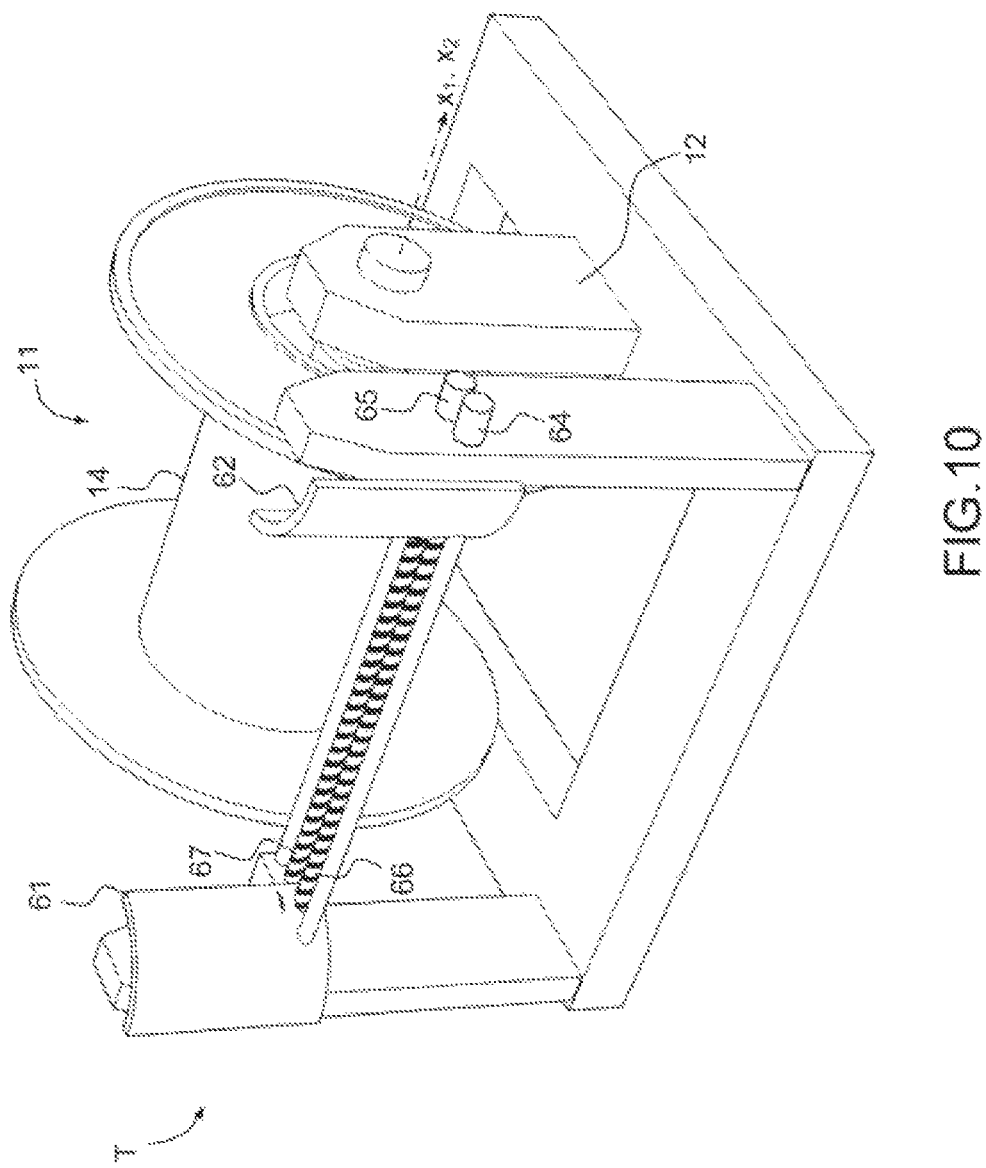
FIG. 10 represents schematically a traverse winding device of a handling device according to the invention in a receiving state.

In an advantageous embodiment, represented in FIGS. 8 to 10, the winch 11 comprises a traverse winding device T enabling orderly winding of the cable 2 around the first drum and the flexible elongate body 3 around the second drum 14 as a function of the state of the winch 11 (decoupled state or, respectively, coupled state), when the drum concerned is rotated about its rotation axis relative to the frame 12. For greater clarity the receiving opening 15 is not represented in FIGS. 8 to 10.

The traverse winding device T comprises two lateral deflectors 61 and 62 spaced along the rotation axis x1. The traverse winding device T is capable of being in at least one traverse winding state represented in FIGS. 8 and 9 in which a first distance separates the lateral deflectors 61, 62 along the axis x1 so as to form a guide in which the cable 2 or respectively the flexible elongate element 3 is intended to slide so as to come to be wound around the drum 13, or respectively the drum 14, of the winch 11 when the latter is rotated about its rotation axis.

In its traverse winding state, the traverse winding device T (also known as a spooling gear or a winding device) enables correct positioning of the flexible elongate body 3 or the cable 2 on the drum concerned in order for the turns generated when winding it around the drum concerned to be arranged in an orderly manner, that is to say turn by turn, so that two adjacent turns are contiguous, and layer by layer.

The function of the guide formed by the deflectors 61, 62 in the traverse winding state is to guide the flexible elongate object in such a manner as to be sure that the portion of the flexible elongate body presented to the drum is oriented substantially perpendicularly to the rotation axis of the drum to enable correct arrangement of the turns.

The traverse winding device T comprises guide means enabling guiding of the deflectors 61, 62 parallel to the axis x1.

The traverse winding device T also comprises driving means 64, 65 enabling the deflectors to be driven along the axis x1 in the same first direction at the same speed, for example to go from FIG. 8 to FIG. 9, so that the distance between the deflectors 61, 62 along the axis x1 remains the same during the movement of the deflectors 61, 62 along the axis x1 in a first direction. This is equally valid in the opposite direction.

In order to enable the towed body 4 to pass through the receiving opening 15 the traverse winding device T is configured so as to be capable of being in a receiving state, as represented in FIG. 10, in which the distance separating the deflectors 61 and 62 along the axis x1 is greater than in the traverse winding state, as represented in FIGS. 8 and 9. This enables a towed body 4 that is elongate along the longitudinal axis I substantially parallel to the first axis x1 to pass between the two deflectors 61 and 62 without being immobilized, so as to be able to pass through the opening 15.

A distance greater than the length of the towed body (along the axis I) can advantageously separate the deflectors 61, 62 along the axis x1.

To this end, the driving means 64, 65 comprise two distinct driving devices 64 and 65. Each driving device 64 or 65 enables one of the deflectors 61 or 62 to be driven in translation independently of the other deflector relative to the frame 12 along the axis x1 so that the traverse winding device T is capable of being in a receiving state in which a greater distance separates the two deflectors 61 and 62 than in the traverse winding state.

In a non limiting embodiment represented schematically in FIGS. 8 to 10, the guide means comprise two guide devices each placing one of the deflectors in sliding connection with the frame 12 along an axis substantially parallel to the axis x1. Each guide device comprises a threaded rod 66 or 67 helically connected to one of the deflectors 61 or 62. To this end, the deflector concerned comprises a nut engaged with a thread of the threaded rod 66 or 67. The threaded rod 66 or 67 is connected to the frame 12 by a pivot connection enabling the threaded rod 66 or 67 to turn relative to the frame 12 about a longitudinal axis of the threaded rod 66 or 67. That longitudinal axis is substantially parallel to the axis x1. The deflector 61 or 62 is moreover connected to the frame 12 by a connection preventing the deflector 61 or 62 from turning relative to the frame 12 about the longitudinal axis of the threaded rod 66 or 67.

Each driving device 64 or 65 comprises a rotary motor coupled to the threaded rod 66 or 67 engaged with one of the deflectors 61 or 62. Rotation of the threaded rod 66 or 67 in one direction drives movement in translation of the deflector 61 or 62 in a direction parallel to the axis x1 and rotation of the threaded rod 66 or 67 in the opposite direction drives movement in translation of the deflector 61 or 62 in the other direction parallel to the axis x1.

As an alternative to the rotary motor, there may be provided a driving device that is for example of the linear motor or rack or cylinder or pendular attachment type.

The invention relates equally to an underwater system comprising the handling device according to the invention and the underwater device. The traction cable 2 of the underwater device is capable of being connected to the first drum 13 so as to be able to come to be wound around the first drum when the first drum is rotated about its rotation axis relative to the axis x1 when the winch is in the decoupled state.

As can be seen in FIG. 5, the towed body 4 advantageously extends along the longitudinal axis from a first longitudinal end 42 of the towed body 4 as far as a second longitudinal end 43 of the towed body 4. The first longitudinal end 42 is advantageously rigidly connected to the second longitudinal end 43.

The linear transmit antenna 40 incorporated in the body 4 is therefore not deformed either during towing by the surface vessel when it is totally submerged or during recovery of the antenna on board the surface vessel or during its stowage on board the surface vessel. This configuration enables a precise knowledge of the characteristics of the antenna radiating pattern. This configuration facilitates the technical implementation of the sonar device by guaranteeing the alignment of the electro-acoustic transducers. Irksome steps of adjustment of the sonar device to guarantee this geometry when towing it are not necessary.

A towed device, which is the towed body 4 in the nonlimiting example from the figures, is configured and connected to the traction cable 2 and to the body 3 so that the towed body is capable of adopting a substantially vertical orientation (with I substantially parallel to z) when it (the towed body) is towed by the cable 2 and totally submerged.

In order to facilitate obtaining a vertical orientation of the linear transmit antenna 40 in operation, the towed device, for example the towed body 4 in the example from the figures, is balanced so as to have, in hydrostatic equilibrium, that is to say when it is subjected only to the force of gravity and to the Archimedean upthrust, a hydrostatic equilibrium orientation in which the longitudinal axis I is substantially vertical (parallel to the axis z) and in which the first longitudinal end 42 of the towed body 4 is at a greater depth than its second longitudinal end 43. In other words, in this orientation of hydrostatic equilibrium, the first longitudinal end 42 is farther from the mean level of the surface of the sea than the second longitudinal end 43.

To this end, the towed body 4 comprises for example a ballast of greater density than the density of water in the vicinity of the first longitudinal end 42 and a float having a positive buoyancy in the vicinity of the second longitudinal end 43.

Alternatively, the towed body comprises a ballast of greater density than the density of water in the vicinity of the first longitudinal end 42 or a float having a positive buoyancy in the vicinity of the second longitudinal end 43.

The towed body 4 may have a substantially neutral buoyancy but this is not indispensable. Alternatively, the towed body 4 has a negative buoyancy that enables it to reach greater depths.

In the embodiment from the figures, the towed device is the towed body 4.

In a variant, the towed device comprises the towed body and an assembly comprising at least one ballast and/or an assembly comprising at least one float. The towed body being configured and the assembly comprising at least one ballast and/or the assembly comprising at least one float being configured and connected to the towed body 4 so that the towed body has the required orientation (with I substantially vertical) under hydrostatic equilibrium.

The underwater device further comprises an attachment device comprising, as can be seen in FIG. 5, a first hanger 6 and a second hanger 7 that are substantially the same length and each of which connects the traction cable 2 to the towed body 4. In other words, the length of the two hangers differs by at most 5% from the length of one of the hangers.

If the lengths differ slightly between the hangers in compliance with the 5% tolerance, the first hanger 6 has a length less than or equal to the length of the second hanger 7 for good control of the orientation of the towed body but the hangers preferably have the same length for better control of the orientation of the towed body.

The hangers are flexible elongate bodies. They are for example cables or ropes or straps or small chains. Each hanger may be a portion of a flexible element longer than the hanger, extending beyond the first end and/or the second end of the hanger, or a flexible element of the same length as the hanger.

Each of the hangers 6 and 7 has a fixed or invariable length. In other words, the hangers do not stretch during operations of launching, recovery, stowage and towing of the underwater device. This embodiment has the advantage of being simple, economical and robust. It does not necessitate any mechanism for varying the lengths of the hangers.

Alternatively, at least one of the two hangers 6 and 7 has a variable length. For example, the hangers 6 and 7 have a variable length. The length of one or more hangers can therefore be varied during recovery or launching of the towed body.

In a variant, the towed device includes the hangers 6 and 7 and one of the hangers includes a ballast and the other hanger includes a float so that the towed body has a vertical orientation when the towed body 4 is towed by the traction cable 2.

The traction cable 2 has a first end intended to be connected to the surface vessel B and more particularly to the handling device 210 and a second end 2b connected to a first end 6a of the first hanger 6. A second end 6b of the first hanger 6 is attached to the towed body at a first fixing point 44 of the towed body 4 situated in the vicinity of the first longitudinal end 42. The second hanger 7 has a first end 7a connected to the second end 2b of the traction cable 2 and a second end 7b attached to the towed body 4 at a second fixing point 45 of the towed body 4 situated in the vicinity of the second longitudinal end 43. The two fixing points 44 and 45 are at a distance from one another along the longitudinal axis I. The second fixing point 45 is rigidly connected to the first fixing point 44.

By fixing point is meant the point at which the hanger exerts a traction force on the towed body 4. The traction force exerted by the traction cable 2 on the hanger is transmitted to the fixing point by the hanger.

In the example from the figures, the ends 6a and 7a are fixed relative to the end 2b of the traction cable 2.

The two hangers may be attached to the traction cable.

Each of the two hangers advantageously has a stiffness lower than that of the traction cable 2.

Alternatively, one of the two hangers is a portion of the traction cable. In other words, the device comprises a continuous cable comprising the traction cable and the hanger and having one diameter. In other words, the diameter of the continuous cable is substantially the same over all the length of the continuous cable.

The stiffness of the continuous cable is advantageously substantially fixed along the continuous cable. In other words, the stiffness has substantially the same value over all of the length of the continuous cable.

The hangers 6 and 7 are arranged so as to form a V when they are taut. The V has a bottom to which the second end 2b of the cable is fixed.

The hangers 6, 7 may be permanently or removably fixed to the towed body 4.

The towed body 4 can be connected to the traction cable by only two hangers, the first hanger 6 and the second hanger 7. In a variant, the sonar device includes an assembly comprising at least one intermediate hanger connecting the traction cable to the towed body by being fixed to the towed body at a fixing point disposed between the first fixing point 44 and the second fixing point 45.

The underwater device 1 may include a third hanger 8 having a first end 8a attached to the towed body 4 at a third fixing point 46 (which is situated at the level of the first longitudinal end 42, along the axis I, in the nonlimiting embodiment from FIG. 5) of the towed body 4 and a second end 8b connected to a first end 3a of the flexible elongate body 3 and a fourth hanger 9 comprising a first end 9a attached to the towed body 4 at a fourth fixing point 47 (which is situated at the level of the second longitudinal end 43, along the axis I, in the nonlimiting embodiment from FIG. 5) of the towed body 4 and a second end 9b connected to the first end 3a of the flexible elongate body 3. The third fixing point and the fourth fixing point 47 are rigidly connected together.

The variants of the positions of the first fixing point and of the second fixing point described for the hangers 6 and 7 are applicable to the new fixing points of the hangers 8 and 9 to the towed body 4. Likewise, the properties and the arrangement of the first hanger and of the second hanger disclosed above as well as their variants apply equally to the third and to the fourth hanger.

In the example from the figures, the ends 8b and 9b are fixed relative to the end 3a of the flexible elongate element 3.

The third fixing point 46 for the first end 8a of the third hanger 8 is advantageously situated at the same distance from the first longitudinal end 42 of the towed body 4 as the first fixing point 44 for the second end 6b of the first hanger 6 and the fourth fixing point 47 for the first end 9a of the fourth hanger 9 is situated at the same distance from the second longitudinal end 43 of the towed body 4 as the second fixing point for the second end 7b of the second hanger 7.

Alternatively, these distances are not all equal.

The hangers 8 and 9 may have substantially the same length as the hangers 6 and 7 or a different length.

The hangers 8 and 9 are arranged so as to form a V when they are taut. The V has a bottom rigidly connected to the first end 3a of the flexible elongate body 3.

Because of its particular attachment device, the sonar device has the advantage of enabling simple and relatively safe recovery and launching of the towed body 4 from a surface vessel B whilst maintaining the geometry of the linear transmit antenna 40 fixed, which assures easy adjustment of the device. The use of a pivoting arm or a crane is not indispensable.

The underwater device, initially submerged so that the towed body 4 is totally submerged, can be recovered and launched in a simple manner from the surface vessel B by a lightweight and simple handling device comprising: the winch 211 and a deflector 60, being a convex friction surface having an overall shape of a portion of a cylinder (not necessarily of circular section) extending longitudinally along an axis x of the deflector, the deflector 60 being disposed so as to extend substantially horizontally in a calm sea and substantially perpendicularly to a vertical plane substantially parallel to an axis of the traction exerted on the traction cable 2 by the handling device during a first winding step in which the first drum 13 is rotated about the first axis x1 relative to the frame 12 so that the traction cable 2 comes to be wound around the first drum 13.

The deflector 60 is moreover disposed so that the first hanger 6 and the second hanger 2 come to bear on the deflector 60 so as to be deflected by the deflector 60 during the first winding step so that the longitudinal axis I extends substantially parallel to the axis x of the deflector 60 when the towed body 4 is totally out of the water and suspended from the hangers 6 and 7, as can be seen in FIG. 6 and as explained in more detail hereinafter. The hangers 6 and 7 are then taut and linear between the deflector 60 and the elongate body 4. In other words, when the towed body 4 is suspended from the hangers 6 and 7 deflected by the deflector 60 the longitudinal axis I is substantially parallel to the axis x of the deflector.

In fact, as represented in FIG. 5, when the underwater device is towed by the surface vessel B, the towed body 4 being totally submerged and towed via the traction cable 2, the two hangers 6 and 7 are substantially taut and the towed body 4 is substantially vertical (that is to say has its longitudinal axis substantially vertical) because of the hydrostatic forces and the drag forces acting on the towed body when the shape of the elongate body is appropriate, for example when the shape of the towed body 4 is substantially symmetrical relative to a plane perpendicular to the longitudinal axis I and relative to a plane containing the longitudinal axis I intended to contain the traction cable during towing.

The traction cable 2 is capable of bearing on the deflector 60 so as to be deflected by the deflector 60 in the vertical plane containing the traction cable 2 when towing the sonar device, the elongate body being totally submerged. This is true when the towing speed of the ship is less than or equal to a certain threshold for a given implantation of the handling device on board the surface vessel B.

As long as the towed body 4 is completely submerged (even when stopped), the towed body 4 remains substantially vertical (longitudinal axis I substantially vertical) because of the hydrostatic forces when it is configured to be substantially vertical when it is subjected only to the Archimedean upthrust and to gravity, for example when it comprises a float in the vicinity of the second end 43 and a ballast in the vicinity of the first end 42.

During a first winding step, in which the first drum 13 is rotated about the first axis x1, the traction cable 2 comes to be wound around the first drum 13.

When the first hanger 6 comes to bear on the deflector 60 and is deflected by the deflector 60 the towed body 4 tilts because of its weight, the second end 43 of the towed body 4 entraining with it the second end 7b of the second hanger 7, which tends to remain taut. The towed body 4 therefore tilts progressively during the first winding step, that is to say when the rotation of the first drum 13 about the axis x1 continues in the same direction such that the cable 2 exerts on the hangers 6, 7 a traction toward the first drum in a plane substantially perpendicular to the axis x, until the second hanger 7 comes to bear on the deflector 60 to be deflected by the deflector 60.

When the two hangers 6 and 7 are in bearing engagement and deflected by the deflector 60 they are taut between the deflector 60 and the towed object 4. As the two hangers 6 and 7 are substantially the same length and the deflector 60 has a substantially fixed section along the axis x, the portions of the hangers 6 and 7 situated between their respective bearing zones on the deflector 60 and the towed body 4 are the same length and in calm seas the towed body 4 adopts a so-called handling orientation in which the longitudinal axis I is substantially parallel to the axis x of the deflector 60.

Upon the rotation of the first drum 13 continuing in the same direction, the towed body 4 completely out of the water and suspended from the hangers 6 and 7 has, in calm seas, the handling attitude in which its longitudinal axis I is substantially parallel to the axis of the deflector, as represented in FIG. 6. If the sea is agitated, the orientation of the towed body 4 can vary but is held more and more firmly in the handling orientation as the towed body 4 approaches the deflector 60, that is to say as long as the length of the portions of the hangers 6 and 7 situated between their zones bearing on the deflector 60 and the towed body 4 decreases. The freedom of movement of the towed body 4 is reduced, until it comes to bear on the deflector 60 and is recovered on board the surface vessel B as can be seen in FIG. 6.

Conversely, during a method of launching the underwater device, the towed body is retained substantially in the handling orientation by the two hangers bearing on the deflector until it is submerged.

The device for attaching the underwater device by means of the hangers 6, 7 enables safe launching and recovery of a towed body 4 from a surface vessel B, which limits the risk of impacts between the towed body 4 and the stern PO of the surface vessel B. Because of its simplicity, and the relatively safe recovery and launching of the towed body 4 from a surface vessel, this underwater device is well suited to use on board a USV. Moreover, the recovery of the towed body 4 in the handling orientation enables an opening of reduced height to be provided to the rear of the surface vessel and the formation of recesses in the deck of the surface vessel to be avoided and the size of the stowage zone of that body to be limited along an axis that is substantially horizontal and perpendicular to the axis x. The handling orientation equally favors its stable and compact stowage on the drum of a winch with its axis substantially parallel to the axis x.

The axis x is advantageously substantially perpendicular to the longitudinal axis of the surface vessel. This enables stowage of the towed body secured against rolling and pitching.

The deflector 60 has substantially the shape of an angular portion about the axis x of a cylinder with axis x. In the particular and nonlimiting embodiment from FIGS. 5 to 7, the deflector 60 takes the form of a roller mounted to turn relative to the carrier vessel about its rotation axis x. This enables limitation of the friction between the deflector 60 and the sonar device during launch and recovery operations. Alternatively, the roller R is fixed relative to the surface vessel B.

In the embodiment from FIGS. 5 to 7, the handling device comprises a set of adjacent cylindrical rollers R with longitudinal axes substantially parallel to one another and aligned with a substantially horizontal axis in calm sea perpendicular to the axis x.

The rollers R are advantageously configured and disposed so that the towed body 4, oriented so that the axis I is substantially parallel to the axis x, is capable of resting on two rollers R that prevent movement of the towed body 4 along the axis along which the rollers R are aligned. The two adjacent rollers therefore form a nest for stowing the towed body 4.

The axis along which the rollers R are aligned may be horizontal in a calm sea, as can be seen in FIGS. 5 to 7, or inclined relative to the horizontal in a calm sea. The inclination favors stable retention of the towed body in pitching because of the effect of gravity and the traction of the hangers. Moreover, the inclination allows easy launching.

The rollers R are advantageously sized so that the towed body 4 resting on two adjacent rollers is in direct physical contact only with the two adjacent rollers R. This enables limitation of the risks of deterioration of the towed body 4.

In FIGS. 5 to 7, the axis x of the deflector 60 is substantially parallel to the first rotation axis x1 of the first drum 13. This enables easy insertion of the towed body 4 into the space 240 through the receiving opening 215. Alternatively, these axes could not be parallel, for example in the situation where a pulley would divert the axis of the traction cable 2 in a horizontal plane between the deflector 60 and the first drum.

In FIGS. 5 to 7, the hangers 6 and 7 are fixed to the longitudinal ends of the elongate body. In other words, the fixing points 44 and 45 are situated at the level of, that is to say at zero distance from, the respective longitudinal ends 42 and 43 along the longitudinal axis I. This embodiment enables limitation of the risks of jamming of the ends of the elongate body during its recovery.

In a less advantageous variant, at least one of the two fixing points 44 and 45 is situated at a distance along the longitudinal axis I from the longitudinal end in the vicinity of which it is situated.

The distance separating the first fixing point 44 from the first longitudinal end 42 along the axis I is advantageously substantially the same as the distance separating the second fixing point 45 from the second longitudinal end 43 along the axis I. This makes it possible to favor the vertical orientation of the longitudinal transmit antenna under tow. Alternatively, these two distances are different but this is less advantageous for the stability of the towed body under tow.

In the nonlimiting embodiment from FIGS. 5 and 6, the two hangers 6 and 7 are too short for the first hanger 6 to bear on the deflector 60 and be deflected by the deflector 60 when the towed body 4 is still submerged. The tilting of the towed body 4 because of its weight when the end 43 leaves the water is limited by the traction exerted by the flexible elongate body 3 on the towed body 4 when it leaves the water. The traction exerted by the flexible elongate element 3 on the towed body 4 via the third hanger 8 and the fourth hanger 9 limits the inclination of the towed body 4 relative to the vertical plane containing the traction cable 2. Moreover, the traction exerted by the elongate flexible element 3 on the towed body moves it away from the stern of the surface vessel. The presence of the flexible elongate body enables limitation of the risks of impacts with the surface vessel.

Alternatively, if the two hangers 6 and 7 are sufficiently long for the first hanger 6 to bear on the deflector 60 and to be deflected by the deflector when the towed body 4 is still submerged, then the traction exerted by the flexible elongate body 3 on the towed body holds back the towed body and slows its tilting when it leaves the water until the two hangers come to bear on the deflector 60 and are deflected by the deflector 60. The orientation of the towed body is therefore even better controlled.

In FIGS. 5 to 7, the handling device comprises a deflector 60 disposed upstream of the first drum 13 as seen from the towed body 4, the first hanger 6 and the second hanger 7, both initially submerged, during the first winding step. In other words, the hangers are capable of coming to bear on the deflector 60 before coming to be wound around the first drum 13 during the first winding step.

To be more specific, the deflector 60 is disposed in the vicinity of the stern of the surface vessel B so that the towed body 4 has the handling orientation (with x substantially parallel to I) before it reaches the side of the surface vessel B. The deflector 60 is for example the first element of the handling device and/or of the surface vessel encountered by the hangers during a method of recovering/stowing the initially deployed sonar device towed by the surface vessel. This enables limitation of the risks of impacts between the towed body 4 and the stern of the ship. This also enables the avoidance of the design of openings of large size at the rear of the carrier vessel to enable the recovery of a linear transmit antenna and to avoid creating a recess in the main deck of the surface vessel in order to be able to stow a linear transmit antenna that is too high to be housed between the main deck and the upper deck.

The deflector 160 of the handling device from FIGS. 2 and 3 differs from that from FIGS. 5 to 7 in that it is closer to the first drum 13 and more particularly the opening 15 so that the towed body passes through the opening 15 substantially in the handling orientation (I substantially parallel to the axis of the deflector along which the deflector 160 extends longitudinally). This enables limitation of the risks of impacts between the towed body 4 and the second drum 14 when it passes through the receiving opening 15 and therefore limitation of the risks of jamming when it reaches the drum. When the axis of the deflector is substantially parallel to the axis x1, this also makes it possible without intervention of any machinery or an operative to bring the towed body 4 naturally into an orientation favorable to its passage through the receiving opening 15 and its stable and easy stowage on the first drum 13 (axis I substantially parallel to the axis x1), the towed body 4 being capable of being held in contact with the first drum 13 over all its length. In the nonlimiting example from FIGS. 2 and 3, the deflector 160 is disposed upstream of the drum 13 and mounted on the second drum 14 so as to delimit the receiving opening 15.

More generally, a deflector 160 may be disposed so that the towed body 4 passes through the opening 15 substantially in the handling orientation and/or comes to bear on the drum 13 substantially in the handling orientation.

This type of deflector 160 is disposed between the stern of the surface vessel and the first drum 13 for example, between a deflector 60 and the first drum 13. This deflector 160 is for example part of the winch by virtue of being, for example, disposed on the upstream side of the first drum 13, for example upstream of the receiving opening 15 (during the first winding step) or at the level of the receiving opening 15.

Different deflectors that occupy different positions described hereinabove may alternatively be provided in the same handling device.

It is to be noted that the first drum 13 equally constitutes a deflector. In a variant that is not represented, the handling device comprises a single deflector formed by the first drum 13.

The underwater system is in no way limited to an underwater device of the type comprising a towed body 4 attached to the cable 2 and to the flexible elongate body 3 as in FIGS. 5 to 7. In an alternative to FIGS. 5 to 7, the elongate body is for example connected to the traction cable by way of a body on which it is mounted to pivot about a rotation axis so as to be capable of passing from the vertical position when towed submerged to a capture position in which its longitudinal axis extends substantially parallel to the axis x1 during the first towing phase.

The control device for controlling the handling device (coupling/decoupling means, first coupling/decoupling means, driving means, immobilization means, opening means) may comprise one or more dedicated electronic circuits or a general purpose circuit. Each electronic circuit may comprise a reprogrammable computation machine (a processor or a microcontroller for example) and/or a computer executing a program containing a sequence of instructions and/or a dedicated computation machine (for example a set of logic gates like an FPGA, a DSP or an ASIC, or any other hardware module).

In the examples represented in the figures, the winch comprises a single second drum 14. In a more complex variant, the winch comprises an assembly comprising a plurality of second drums as defined above. These second drums have different diameters so as to surround one another. Each second drum 14 features an opening giving access to the space situated between that second drum and the drum of directly smaller diameter. This enables, for example, recovery of different towed bodies into the space delimited between each second drum and the drum of directly smaller diameter or winding of portions of flexible elongate elements with different flexibilities onto drums with different diameters.

All the drums may be coupled in rotation and each drum may be decoupled in rotation from the other drums.

In the examples represented in FIGS. 2 and 3 and 5 to 7, the underwater device comprises a single towed body.

Alternatively, the underwater device comprises an assembly of a plurality of towed bodies. The handling device may then comprise one or more second drums.

Each towed body is advantageously elongate along a longitudinal axis and the same length, but this is not obligatory.

The underwater device comprises for example an assembly comprising a plurality of towed bodies 4. The towed bodies 4 are connected to one another, to the traction cable 2 and to the flexible elongate element 3 so as to be distributed along a curved towing line defined by the traction cable and the flexible elongate element when the underwater device is towed by the surface vessel, the assembly of towed bodies being distributed along the towing line.

Figure 12:
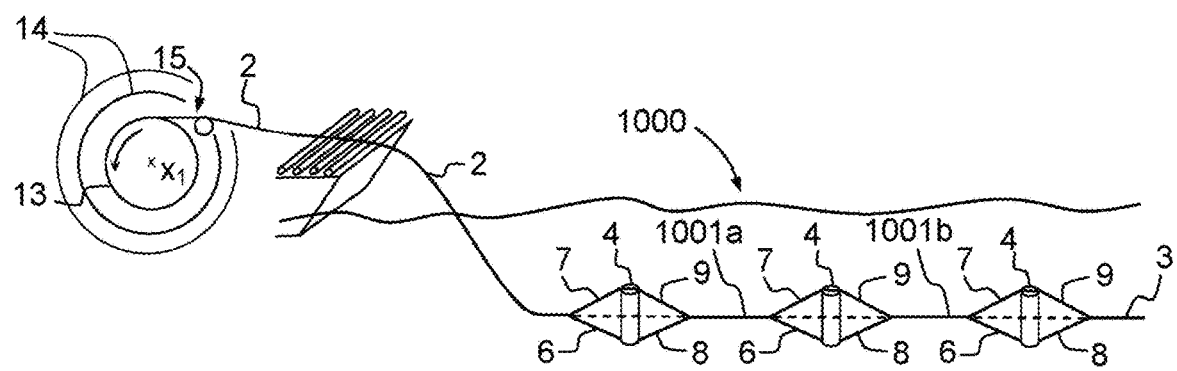
FIG. 12 represents schematically an underwater device comprising a plurality of towed bodies.

An example of this type of device is represented in FIG. 12. The underwater device 1000 comprises a plurality of towed bodies 4 distributed along the towing line defined by the cable 2 and the flexible elongate body 3 and drawn in dashed line between the two. The towed bodies 4 are connected to one another by intermediate lines 1001a, 1001b.

The system is for example configured so as to stow or to enable to be stowed a plurality of towed bodies bearing on the first drum 13 or, more generally, between the first drum 13 and the second drum 14, or so as to stow or to enable to be stowed different towed bodies in the successive spaces defined between the successive adjacent drums or bearing on successive drums.

In the example from FIG. 12, the towed bodies 4 are connected two by two by intermediate lines 1001a, 1001b via hangers. Each intermediate body is fixed to a first and a second hanger 6, 7 connecting it to the traction cable and to a third and a fourth hanger 8, 9 connecting it to the flexible elongate body.

Figure 13:
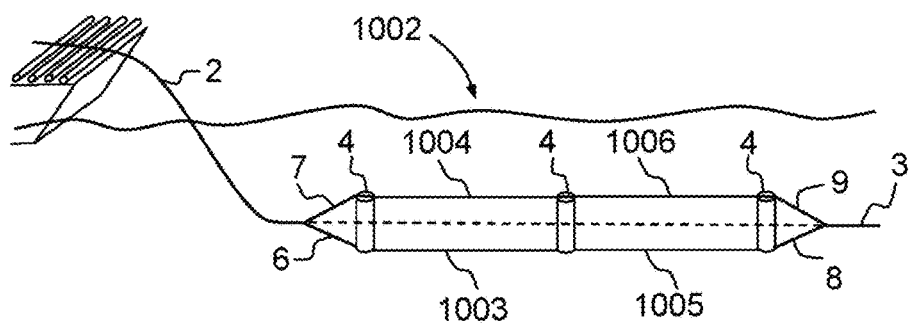
FIG. 13 represents schematically an underwater device comprising a plurality of towed bodies interconnected in a different way than those in FIG. 12.

Alternatively, in the underwater device 1002 from FIG. 13, the towed bodies 4 are connected two by two by sets of intermediate lines 1003, 1004 and 1005, 1006. One of the towed bodies is fixed to a first and a second hanger 6, 7 connecting it to the cable. This towed body is connected to the adjacent towed body by a plurality of intermediate lines 1003, 1004 that are substantially parallel under tow. This towed body is itself connected to the last adjacent towed body by intermediate lines 1005, 1006. The last towed body is fixed to a third and a fourth hanger 8, 9 connecting it to the flexible elongate body.

Each intermediate line is a flexible elongate element that can take the form of a cable, for example an electrical/traction cable. Each intermediate line may comprise at least an electroacoustic transducer. It may integrate an acoustic antenna, for example, an acoustic receiving antenna.

The invention claimed is:

1. An underwater system comprising a handling device configured to be installed on a surface vessel to enable stowage and deployment of an underwater device intended to be towed by the surface vessel, the underwater device including a traction cable, a flexible elongate body and an assembly comprising at least one towed body situated between the flexible elongate body and the traction cable, the handling device comprising a winch comprising a frame intended to be attached to a structure of the surface vessel and a first drum capable of turning relative to the frame about a first rotation axis and an assembly comprising at least one second drum which surrounds the first drum and is capable of turning relative to the frame about a second rotation axis substantially parallel to the first rotation axis, the winch being capable of being in a decoupled state wherein the first drum and the second drum are rotationally decoupled about the first rotation axis and the second rotation axis so as to allow the traction cable to be wound around the first drum during a first winding step wherein the first drum is rotated about the first axis, the second drum being capable of being in an open state wherein the second drum has a receiving opening that the towed body is capable of passing through in order to enter the interior of the space that surrounds the first drum and that is surrounded by the second drum, the winch being capable of being in a coupled state wherein the first drum and the second drum are rotationally coupled about the second rotation axis so as to allow the flexible elongate body to be wound around the second rotation axis during a second winding step wherein the second drum is rotated about the second axis, wherein the underwater system is configured so that, during the first winding step, the towed body passes through the receiving opening in an orientation wherein the longitudinal axis is substantially parallel to the first rotation axis and/or so that the towed body arrives in the vicinity of the carrier vessel in the orientation wherein the longitudinal axis is substantially parallel to the first rotation axis.

2. The underwater system as claimed in claim 1, wherein the second drum is capable of being in a receiving angular position about the second axis relative to the frame wherein the receiving opening is intended to have the traction cable and the towed body passed through it during the first winding step.

3. The underwater system as claimed in claim 1, wherein the receiving opening is elongate along the first rotation axis.

4. The underwater system as claimed in claim 1, wherein the first drum and the second drum are concentric.

5. The underwater system as claimed in claim 1, wherein the second rotation axis is at a distance from the first rotation axis.

6. The underwater system handling device as claimed in claim 1, wherein the second drum is capable of being alternately in the open state and in a closed state wherein the receiving opening is at least partly closed.

7. The underwater system as claimed in claim 6, wherein the at least one second drum comprises a cap mobile relative to a first part of the second drum, the cap being capable of being in a first position wherein the cap opens the second drum so that it comprises the receiving opening and in a second position wherein the cap substantially closes the receiving opening so that the second drum has a substantially cylindrical shape.

8. The underwater system as claimed in claim 1, comprising a traverse winding device that is capable of ordering winding of the traction cable on the winch, the traverse winding device comprising two lateral deflectors spaced along the first rotation axis, the traverse winding device being capable of being in a traverse winding state wherein a small distance separates the lateral deflectors along the first rotation axis and in a receiving state wherein a greater distance separates the deflectors.

9. The underwater system as claimed in claim 1, comprising an assembly comprising a plurality of second drums.

10. The underwater system as claimed in claim 1, wherein the at least one towed body integrates an antenna for emission of acoustic waves, and wherein the flexible elongate body comprises a receiving antenna comprising a plurality of electro-acoustic transducers distributed along the flexible elongate body.

11. The underwater system as claimed in claim 10, wherein the towed body is a body elongate along a longitudinal axis, the transmit antenna comprising a plurality of electro-acoustic transducers distributed along the longitudinal axis.

12. The underwater system as claimed in claim 10, wherein the towed body is a compact hydrodynamic body having a flattened general shape and being suspended from the traction cable when the handling device is deployed.

13. The underwater system as claimed in claim 1, wherein the handling device is configured so as to enable stowage of the towed body in a space that surrounds the first drum and that is surrounded by the second drum without the towed body exiting the space radially.

14. The underwater system as claimed in claim 1, wherein the handling device is configured to execute the following steps during a process of stowing the initially deployed underwater device:

the first winding step wherein the first drum of the winch, being in the decoupled state, is rotated about the first rotation axis relative to the frame so as to come to wind the traction cable around the first drum, the traction cable passing through the receiving opening, and so that the towed body enters into the space delimited by the second drum through the receiving opening, followed by a winding step wherein the second drum of the winch, being in the coupled state, is rotated about the second rotation axis so as to wind the flexible linear element around the second drum.

15. The underwater system as claimed in claim 1, wherein the underwater device comprises an assembly comprising a plurality of towed bodies.

* * * * *

UNITED STATES PATENT AND TRADEMARK OFFICE
CERTIFICATE OF CORRECTION

PATENT NO. : 12,263,919 B2  
APPLICATION NO. : 17/615022  
DATED : April 1, 2025  
INVENTOR(S) : Vito Suppa et al.

It is certified that error appears in the above-identified patent and that said Letters Patent is hereby corrected as shown below:

In the Claims

In Claim 6, Column 23, Line 42, "The underwater system handling device as claimed in claim 1," should be -- The underwater system as claimed in claim 1, --.

Signed and Sealed this  
Twenty-seventh Day of May, 2025

Coke Morgan Stewart  
*Acting Director of the United States Patent and Trademark Office*